(12) United States Patent
Hecimovich

(10) Patent No.: US 10,876,761 B2
(45) Date of Patent: Dec. 29, 2020

(54) COMBUSTION CHAMBER GASKET FOR USE WITH A PRESSURE WASHER

(71) Applicant: Northern Tool & Equipment Company, Inc., Burnsville, MN (US)

(72) Inventor: Kyle Hecimovich, Lonsdale, MN (US)

(73) Assignee: NORTHERN TOOL & EQUIPMENT COMPANY, INC., Burnsville, MN (US)

( * ) Notice: Subject to any disclaimer, the term of this patent is extended or adjusted under 35 U.S.C. 154(b) by 191 days.

(21) Appl. No.: 15/939,441

(22) Filed: Mar. 29, 2018

(65) Prior Publication Data
US 2019/0301770 A1    Oct. 3, 2019

(51) Int. Cl.
| F24H 1/00 | (2006.01) |
| F24H 1/16 | (2006.01) |
| B08B 3/02 | (2006.01) |
| F23L 5/02 | (2006.01) |
| B23P 15/26 | (2006.01) |

(52) U.S. Cl.
CPC ............. *F24H 1/165* (2013.01); *B08B 3/026* (2013.01); *B23P 15/26* (2013.01); *F23L 5/02* (2013.01); *B08B 2203/007* (2013.01)

(58) Field of Classification Search
CPC .... F24H 1/06; B08B 3/02; B08B 3/04; B08B 3/10; B08B 2203/02; B08B 2203/0211; B08B 2203/0241; F04B 53/22; F04B 43/06
See application file for complete search history.

(56) References Cited

U.S. PATENT DOCUMENTS

| 5,988,157 | A | * | 11/1999 | Brown | F23C 3/00 |
| | | | | | 126/102 |
| 6,085,739 | A | * | 7/2000 | Leiss | B08B 3/026 |
| | | | | | 126/350.1 |
| 9,433,951 | B1 | * | 9/2016 | Arnold | B05B 9/002 |
| 2004/0046044 | A1 | | 3/2004 | Bennett et al. | |
| 2009/0269218 | A1 | | 10/2009 | Gardner et al. | |
| 2014/0116966 | A1 | * | 5/2014 | Podsadowski | B01D 35/30 |
| | | | | | 210/791 |
| 2014/0246517 | A1 | | 9/2014 | Raasch | |

(Continued)

FOREIGN PATENT DOCUMENTS

| AU | 2018202422 | 10/2019 |
| CA | 3000194 | 9/2019 |
| CL | 201801044 | 5/2018 |

(Continued)

OTHER PUBLICATIONS

"Next Generation Cleaning for today's professionals".
(Continued)

*Primary Examiner* — Gregory A Wilson
(74) *Attorney, Agent, or Firm* — Fafinski Mark & Johnson

(57) ABSTRACT

The combustion chamber subassembly comprises a top bell member defining an interior combustion chamber and an exterior, the top bell member including a top diffuser wall, a first side wall extending from the top diffuser wall toward the interior combustion chamber of the top bell member, a second side wall extending from the first side wall toward the exterior of the top bell member, and a gasket that is attached to the top bell member, contacting the first side wall and the second sidewall.

8 Claims, 17 Drawing Sheets

(56) References Cited

U.S. PATENT DOCUMENTS

2016/0084240 A1* 3/2016 Jackson ................. F04B 17/06
417/364

FOREIGN PATENT DOCUMENTS

| | | | |
|---|---|---|---|
| CL | 201801032 A | 9/2018 | |
| CL | 201801033 A | 9/2018 | |
| CL | 201801034 A | 9/2018 | |
| CL | 201801035 A | 9/2018 | |
| CL | 201801036 A | 9/2018 | |
| CL | 201801037 A | 9/2018 | |
| CL | 201801038 | 9/2018 | |
| CL | 201801039 A | 9/2018 | |
| CL | 201801041 | 9/2018 | |
| CL | 201801042 A | 9/2018 | |
| CL | 201801043 A | 9/2018 | |
| CL | 2018001040 | 9/2018 | |
| EP | 3227034 A | 11/2017 | |
| GB | 592915 A * | 10/1947 | ............ F16L 27/108 |
| MX | 2018004971 | 9/2019 | |

OTHER PUBLICATIONS

"Report dated Apr. 20, 2018 for Chilean Patent Application No. 2018-01040".

"Letter by Goytla & Associates regarding Office Action/Notification of Examination Report for Chilean Patent Application No. 2018-01040, said letter being dated Aug. 1, 2019."

* cited by examiner

US 10,876,761 B2

COMBUSTION CHAMBER GASKET FOR USE WITH A PRESSURE WASHER

TECHNICAL FIELD

The present disclosure relates generally to blower and heat exchanger assemblies used with pressure washer systems. More specifically, the present disclosure relates to a heat exchanger with a combustion chamber using a gasket to enhance the efficiency of heat transfer.

BACKGROUND

Pressure washers are routinely used in wide variety of applications to remove debris, dirt, fluids and other substances from surfaces needed to be cleaned. For example, driveways, garage floors, concrete or tile patios, stairs, walkways, decks, home exteriors, fencing, cars and trucks, lawnmowers, dirt bikes, boats or trailers, outdoor furniture, and grills may benefit from being pressure washed. Commercial uses include factories, food processing plants or restaurants, agriculture equipment, construction equipment, earth moving equipment, and mining equipment, etc.

As can be imagined, it is sometimes desirable that the fluid being used to wash an item, such as water, water with chemicals or detergent added thereto, other chemical mixtures, etc. be heated to a certain temperature to help remove the undesirable substance that is clinging to a surface that needs to be cleaned. For example, some organic substances such as grease or fat are difficult to remove unless the temperature of the water used reaches a threshold emulsifying temperature. In some applications, it may be desirable that the water reach a certain temperature such as 120 degrees Celsius so that grease may be removed from a surface.

Often, a pressure washer is supplied with a fossil fuel supply such as gasoline or diesel to fuel an engine, which powers a pump for expelling the water at the desired pressure. Also, the same fuel is often used as part of an ignition system that creates a flame that heats air that is blown through a heat exchanger, which in turn, heats the water and/or other cleaning fluids that are intended to clean a surface using the pressure washer. As can be imagined, the amount of fuel burned while maintaining a desired temperature of the cleaning fluid may vary considerably depending on the efficiency of the heat exchanger. If the heat exchanger operates inefficiently, then the profit of a business endeavor using the pressure washer can decrease significantly. Also, emissions to the atmosphere may be increased.

Accordingly, it is desirable to develop a blower and heat exchanger assembly for use with a pressure washer that operates efficiently, minimizing the amount of fuel consumed, and leading to reduced emissions.

SUMMARY OF THE DISCLOSURE

A combustion chamber subassembly for use with a pressure washer according to an embodiment of the present disclosure is provided. The combustion chamber subassembly may comprise a top bell member defining an interior combustion chamber and an exterior, the top bell member including a top diffuser wall, a first side wall extending from the top diffuser wall toward the interior combustion chamber of the top bell member, a second side wall extending from the first side wall toward the exterior of the top bell member, and a gasket that is attached to the top bell member, contacting the first side wall and the second sidewall.

A blower and heat exchanger assembly according to an embodiment of the present disclosure is provided. The blower and heat exchanger assembly may comprise a blower subassembly, a support frame, and a heat exchanger subassembly including an ignition subassembly, a combustion chamber subassembly, an inner shell, an inner coil of heat exchange tubing, and an outer coil of heat exchange tubing, wherein the heat exchanger subassembly defines a first flow passage between the inner coil of heat exchange tubing and the outer coil of heat exchange tubing, a second flow passage between the outer coil of heat exchange tubing and the inner shell, and a sealed passage between the combustion chamber subassembly and the inner coil of heat exchange tubing.

A method of assembling a heat exchanger subassembly according to an embodiment of the present disclosure is provided. The method may comprise attaching a top bell member having angled side walls to a cover, attaching a bottom member to the top bell member, and attaching a gasket to the angled side walls of the top bell member, forming a combustion chamber subassembly.

DETAILED DESCRIPTION

Figure 1:
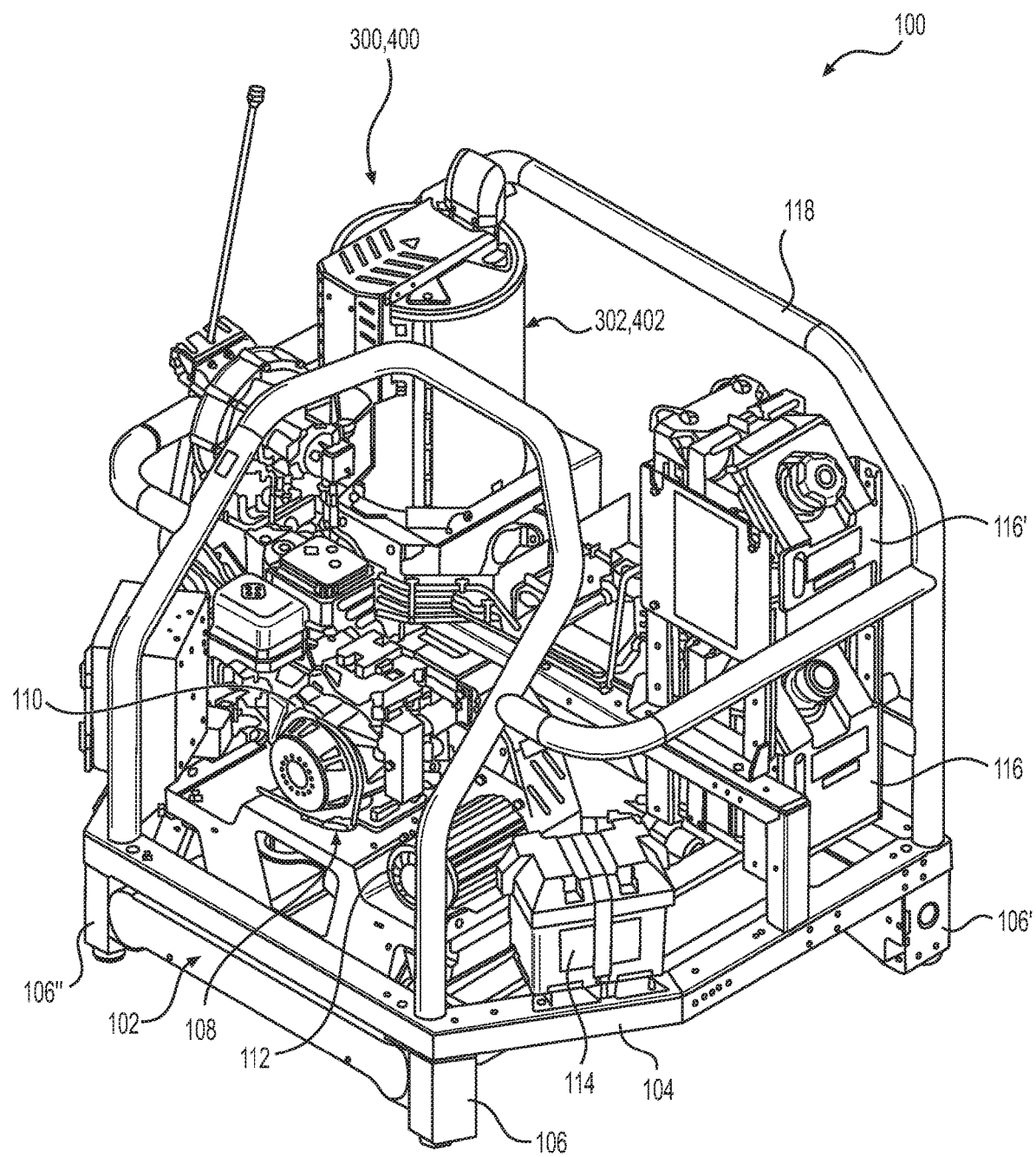
FIG. 1 is a perspective view of a pressure washer mounted on a skid utilizing a blower and heat enhancer assembly according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

A combustion chamber subassembly, a heat exchanger subassembly, a blower and heat exchanger assembly, and a pressure washer that may utilize a combustion chamber gasket according to various embodiments of the present disclosure will now be described. Also, a method of assembling a heat exchanger subassembly using a combustion chamber will also be discussed. These various embodiments may improve the fuel efficiency of a heat exchanger assembly including those used on pressure washers and the like.

Looking at FIG. 1, a pressure washer 100 that is mounted on a skid or skid assembly 102 is illustrated. Such a pressure washer 100 is typically used in immobile or stationary applications near an area where repeated pressure washing is desirable. The skid assembly 102 includes a frame portion 104 and legs 106 or supports that space the frame portion 104 away from the ground or other support surface. Various systems and assemblies are mounted onto the skid assembly 102.

For example, a power unit assembly 108, sometimes referred to as a "PEG" (pump, engine, and generator) assembly is shown to be situated near the front of the skid assembly 102. While the engine 110 and generator 112 are shown, the pump is hidden by the engine 110 in the view of FIG. 1. A battery 114 is also supplied for starting the engine 110. Once the engine 110 is started, it powers the generator 112 and pump (not shown). The engine 110 is an internal combustion engine that may be powered by any suitable fuel including diesel or gasoline. In other embodiments, the power may be provided by an electrical motor, etc. Two fuel tanks 116 are provided. One fuel tank 116 may supply fuel to the engine and the other fuel tank 116 to the combustion head (not shown in FIG. 1) of the heat exchanger as will be discussed.

A blower and heat exchanger assembly 300, 400 are also mounted to the skid assembly 102 on the left side of the skid assembly 102. Heated air is forced through the heat exchanger subassembly 302, 402 that warms water or any other cleaning fluid to a desired temperature. The heated air is created by the combustion head (not shown in FIG. 1) that creates a flame by igniting fuel that is sprayed into a combustion chamber (not shown in FIG. 1) as will be discussed in further detail below.

A cage portion is provided that partially surrounds the various systems and assemblies that are mounted onto the skid assembly 102 to help protect the various systems and assemblies from damage. Also, the cage portion may be used to lift the skid mounted pressure washer 100 so that it may be moved as needed or desired. No water tank is provided with this embodiment of a pressure washer 100 since such a pressure washer 100 is intended to remain in a specific place for a prolonged period of time, allowing a fluid line to be directly attached to the pressure washer 100 for supplying water or other cleaning fluid to the pressure washer 100.

Figure 2:
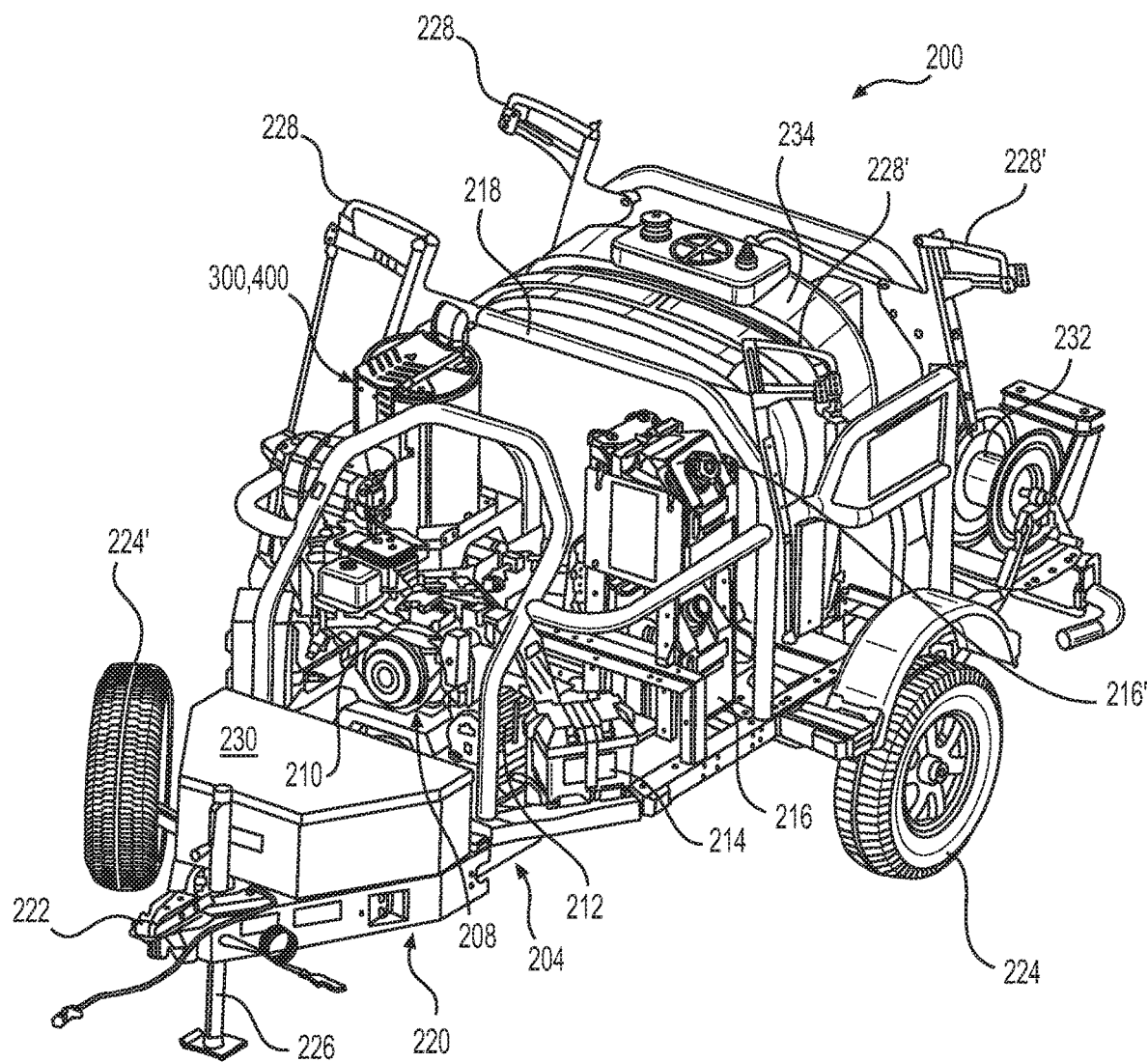
FIG. 2 is a perspective view of a pressure washer mounted on a trailer utilizing a blower and heat exchanger assembly according to an embodiment of the present disclosure similar to the blower and heat exchanger assembly of FIG. 1.

As can be imagined, there are many applications where it is desirable that the pressure washer be portable such as when the area to be cleaned moves frequently or covers a large area. For that reason, a trailer mounted pressure washer 200, as shown in FIG. 2, may be provided. The trailer mounted pressure washer 200 has the same systems and assemblies as described above with respect to the skid mounted pressure washer 100. More specifically, there is a power unit assembly 208 including an engine 210 and a generator 212, a battery 214, a blower and heat exchanger assembly 300, 400 including a combustion head (not shown in FIG. 2), a cage portion 218, and two fuel tanks 216.

However, for this embodiment, the legs 106 of the skid mounted pressure washer 100 (as shown in FIG. 1) are removed and only a skid assembly 204 of the pressure washer 200 is mounted onto the trailer ladder frame 220, which replaces the ladder frame 102 of the skid mounted pressure washer. The trailer ladder frame 220 has a hitch 222 and wheels 224 that allow the trailer ladder frame 220 to be pulled by a vehicle (not shown) to a desired location. A stand 226 is also supplied at the hitch 222 so that the trailer ladder frame 220 may be disconnected from a vehicle while still allowing the pressure washer 200 to remain level or horizontal. This feature may be desirable when the pressure washer 200 may remain in the same place for an undetermined amount of time or if the vehicle is needed elsewhere. Ladder racks 228, a tool compartment 230, and a hose reel 232 are also provided for the convenience of the user.

Cleaning fluid tank(s) 234 that may store water or other cleaning solutions are provided. The hose reel 232 may be used to store a hose (not shown) that may be connected to the cleaning fluid tank 234 and a cleaning fluid source such as a water line to supply cleaning fluid to the tank 234. Or, the hose may be connected to a drain (not shown) located near the bottom of the cleaning fluid tank 234 to facilitate draining of the tank 234.

Pressure washers come in various sizes depending on the type of cleaning they are intended to perform. Household or personal use often requires smaller pressure washers than commercial applications. More particularly, the size of the pressure washer needed may depend on the amount of heated cleaning fluid needed for a particular application.

Figure 3:
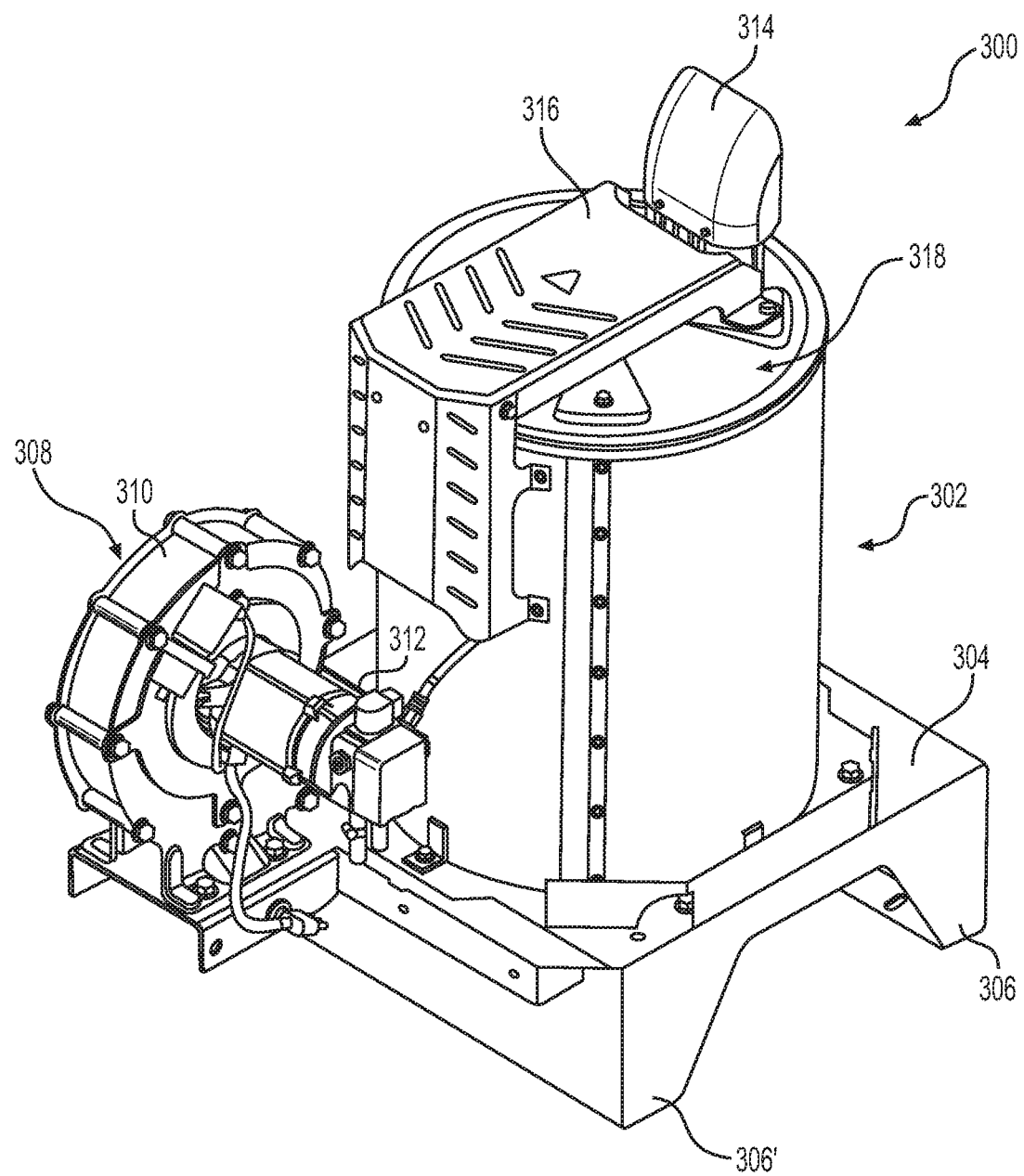
FIG. 3 is a perspective view of a medium sized blower and heat exchanger assembly utilizing a combustion chamber gasket according to an embodiment of the present disclosure that may be employed in the pressure washer shown in FIG. 1 or 2.
Figure 4:
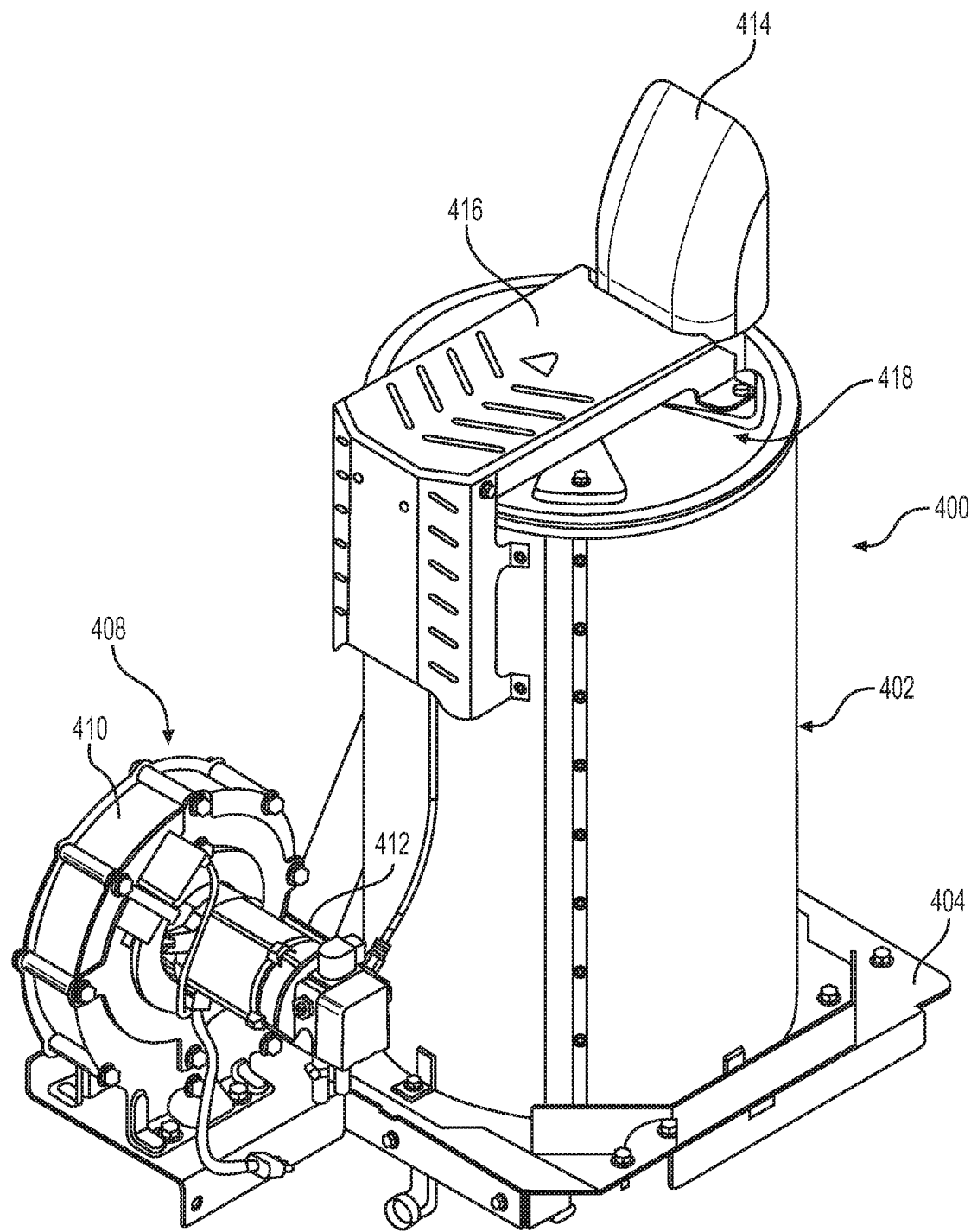
FIG. 4 is a perspective view of a large sized blower and heat exchanger assembly utilizing a combustion chamber gasket according to an embodiment of the present disclosure that may be employed in the pressure washer shown in FIG. 1 or 2.

FIG. 3 depicts a medium sized blower and heat exchanger assembly 300 that may be used for some applications while FIG. 4 shows a large sized blower and heat exchanger assembly 400 that may be used in other applications requiring more heated fluid, higher temperatures, etc. The most visually apparent difference between FIG. 3 and FIG. 4 is that the heat exchanger subassembly 402 is taller in FIG. 4 than the heat exchanger subassembly 302 of FIG. 3. This difference in height is compensated for by providing a support frame 304 with legs 306 for the blower and heat exchanger assembly 300 in FIG. 3 while the support frame 404 of the blower and heat exchanger assembly 400 in FIG. 4 lacks legs. As a result, the overall height of the blower and heat exchanger assembly 300 of FIG. 3 may be approximately the same as the blower and heat exchanger assembly 400 of FIG. 4, or at the least, the difference in height may be adjusted or minimized.

Looking at FIGS. 3 and 4 together, the blower and heat exchanger assembly 300, 400, which may be used in a skid or trailer mounted pressure washer 100, 200, includes a blower subassembly 308, 408 mounted onto the support frame 304, 404, and a heat exchanger subassembly 302, 402 mounted onto the support frame 304, 404. A blower 310, 410 supplies forced air convection from the atmosphere that is conducted through a duct 312, 412 that connects to an internal air intake passage (not shown in FIGS. 3 and 4) that flows to the combustion head (not clearly shown in FIGS. 3 and 4) located at the top portion 318, 418 of the heat exchanger subassembly 302, 402. The air is heated in a combustion chamber (not shown in FIGS. 3 and 4) near the interior of the top portion 318, 418 of the heat exchanger subassembly 302, 402 by the ignited fuel and passes down past a coil of heat exchange tubing on one side of the tubing (not shown in FIGS. 3 and 4). This heated air is then forced back up past one or more coils of the heat exchanger until it hits an exhaust opening (not shown in FIGS. 3 and 4) that leads to an exhaust channel (not shown in FIGS. 3 and 4), and a hood or funnel 314, 414 that is open to the atmosphere, allowing the heated air and exhaust gases to exit the heat exchanger subassembly 302, 402. A guard 316, 416 is also provided to help prevent a user from touching hot components. This operation of the heat exchanger will be discussed in further detail later herein. As used herein, a blower 310, 410 is meant to include any type of fan or other device that creates the movement of air or other heating fluid.

Figure 5:
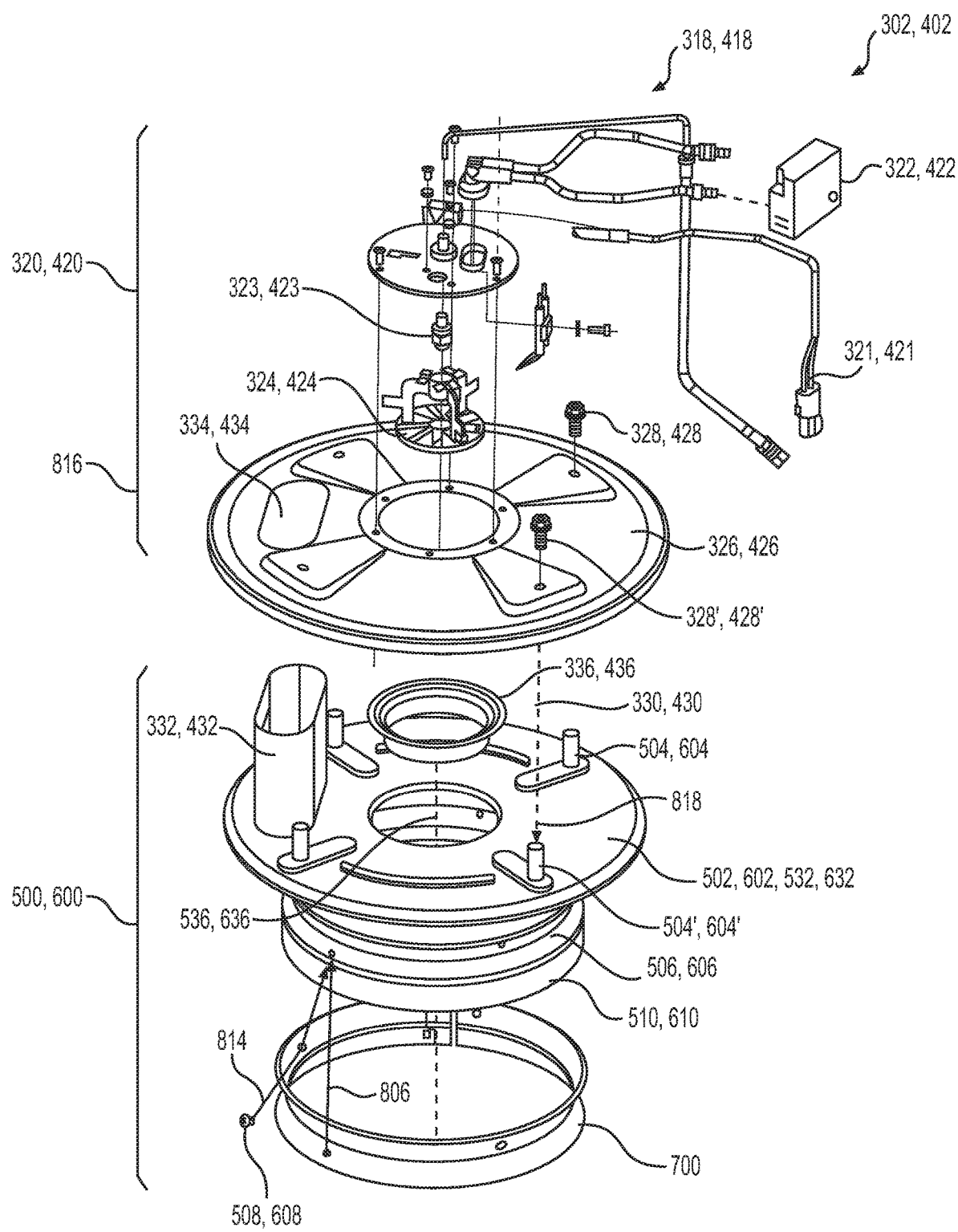
FIG. 5 is an exploded assembly view of the combustion head being assembled with a combustion chamber subassembly according to an embodiment of the present disclosure.

Turning now to FIG. 5, an exploded assembly view of the top portion 318, 418 of the heat exchanger subassembly 302, 402 is depicted. The top portion 318, 418 of the heat exchanger subassembly 302, 402 may comprise a combustion head subassembly 320, 420 that includes a variety of components including an igniter 322, 422, a fuel nozzle 323, 423 and a swirler 324, 424. The igniter 322, 422 lights the fuel while the fuel nozzle 323, 423 aids in dispersing the fuel into the air as the air is supplied to the combustion head subassembly 320, 420 as previously mentioned. A flame sensor 321, 421 is also shown to help ensure that ignition occurs. The combustion head subassembly 320, 420 is attached to a top cover 326, 426, which in turn is attached to combustion chamber subassembly 500, 600 (only partially shown in FIG. 5). The combustion chamber subassembly 500, 600 includes a bottom cover 502, 602 with standoffs 504, 604 that space the top cover 326, 426 from the bottom cover 502, 602 a suitable distance after fastening the top cover 326, 426 to the bottom cover 502, 602 via fasteners 328, 428 or the like, creating an air flow passage 330, 430 between the top cover 326, 426 and the bottom cover 502, 602 through which air is forced by the blower until it reaches the combustion head subassembly 320, 420. The combustion chamber subassembly 500, 600 further includes a top bell member 506, 606, a gasket 700 that is attached to the top bell member 506, 606 (e.g. via rivets 508, 608), and a bottom member 510, 610 (not shown in FIG. 5).

Once the subassemblies 320, 420, 500, 600 shown in FIG. 5 are assembled, the exhaust channel 332, 432, which is attached to the bottom cover 502, 602 (e.g. via welding), passes through a complimentarily shaped exhaust aperture 334, 434 of the top cover 326, 426 where the hood or funnel 314, 414 (see FIGS. 3 and 4) may convey the heated air and the exhaust gas to the atmosphere as previously described. A grommet 336, 436 (may also be referred to as an air jacket ring) is provided between the combustion head subassembly 320, 420 and the bottom cover 502, 602.

Figure 6:
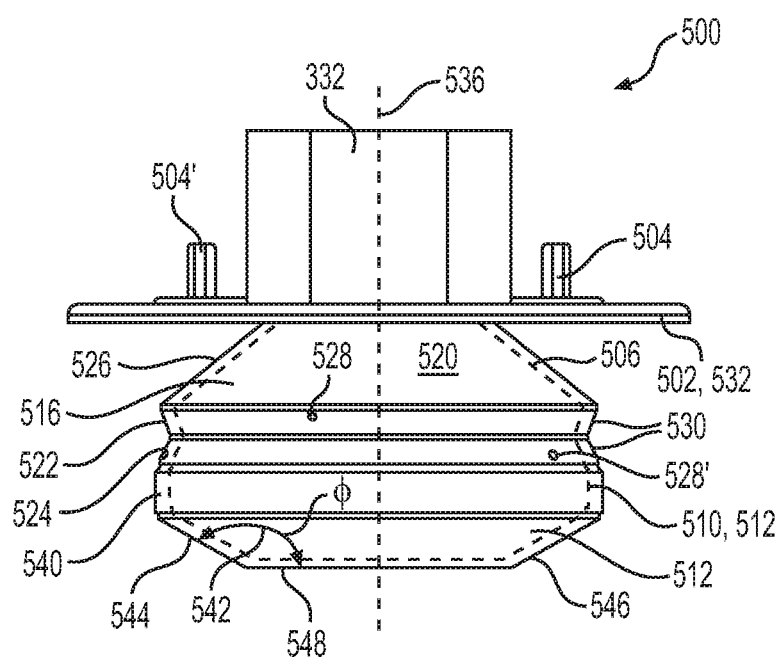
FIG. 6 is a front view illustrating the combustion chamber subassembly completed shown without the gasket being attached.
Figure 7:
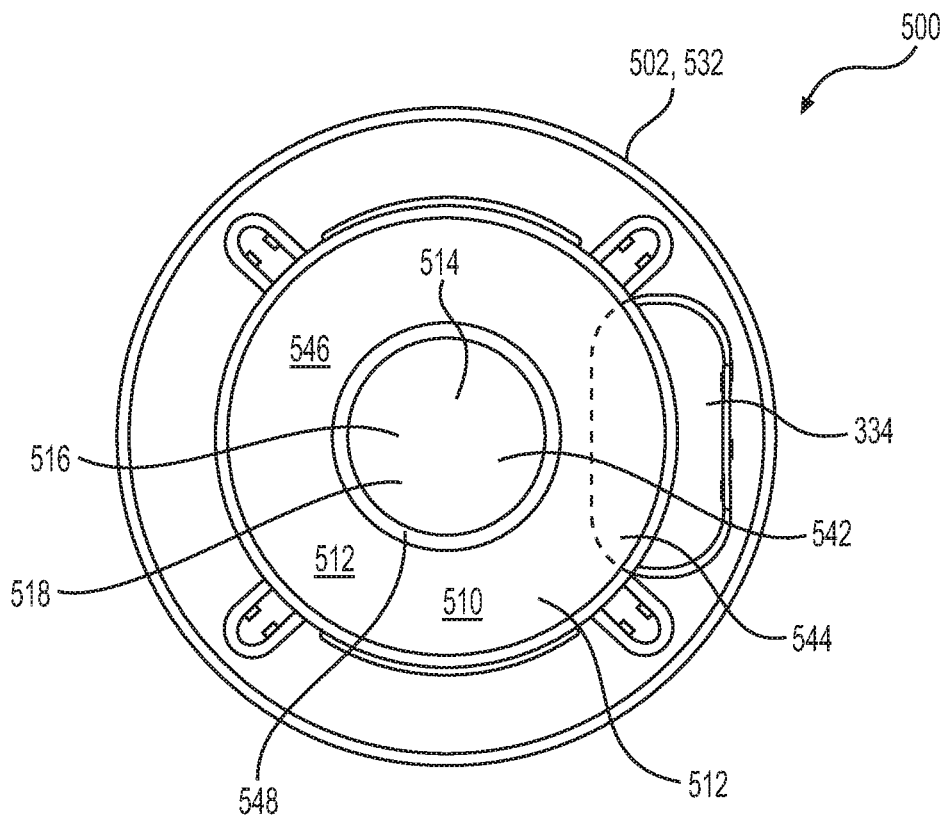
FIG. 7 is a bottom view of the combustion chamber subassembly of FIG. 6, depicting the air exit aperture of the combustion chamber subassembly more clearly.

FIGS. 6 and 7 show a combustion chamber subassembly 500 according to an embodiment of the present disclosure. The combustion chamber subassembly 500 shown has all the features described above with reference to FIG. 5, including a bottom cover 502 with standoffs 504, an exhaust channel 332 surrounding the exhaust aperture 334 and a top bell member 506 attached to the bottom cover 502 (e.g. via swaging). Also, the bottom member 510 takes the form of a bottom bell member 512 that provides an a bottom exit aperture 514 at its bottom portion (see FIG. 7) to allow the egress of exhaust gases and heated air from the combustion chamber 516. The bottom bell member 512 may be attached to the top bell member 506 via welding or the like.

Figure 8:
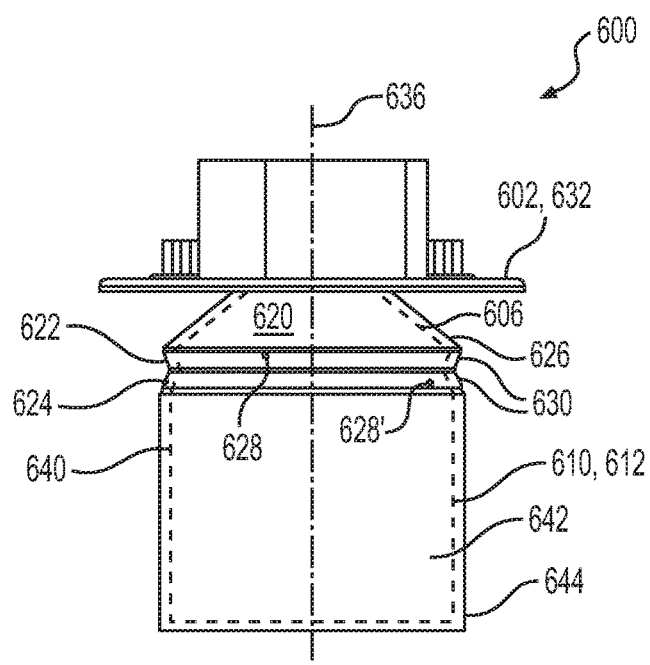
FIG. 8 is a front view illustrating a combustion chamber subassembly according to another embodiment of the present disclosure shown without the gasket being attached.
Figure 9:
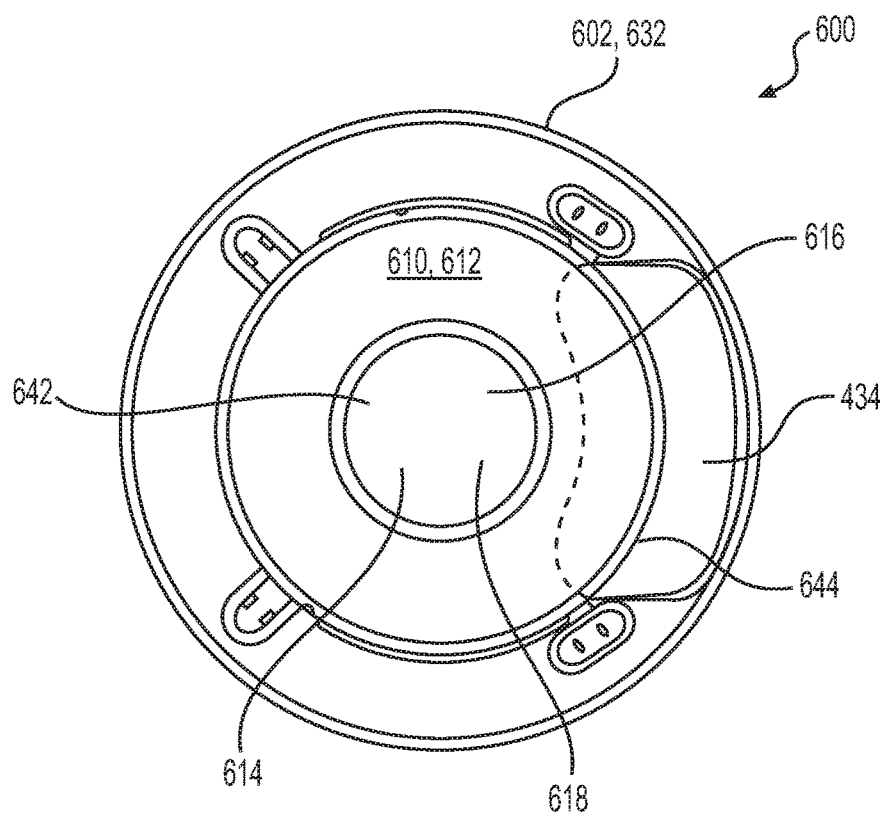
FIG. 9 is a bottom view of the combustion chamber subassembly of FIG. 8, depicting the air exit aperture of the combustion chamber subassembly more clearly.
Figure 10:
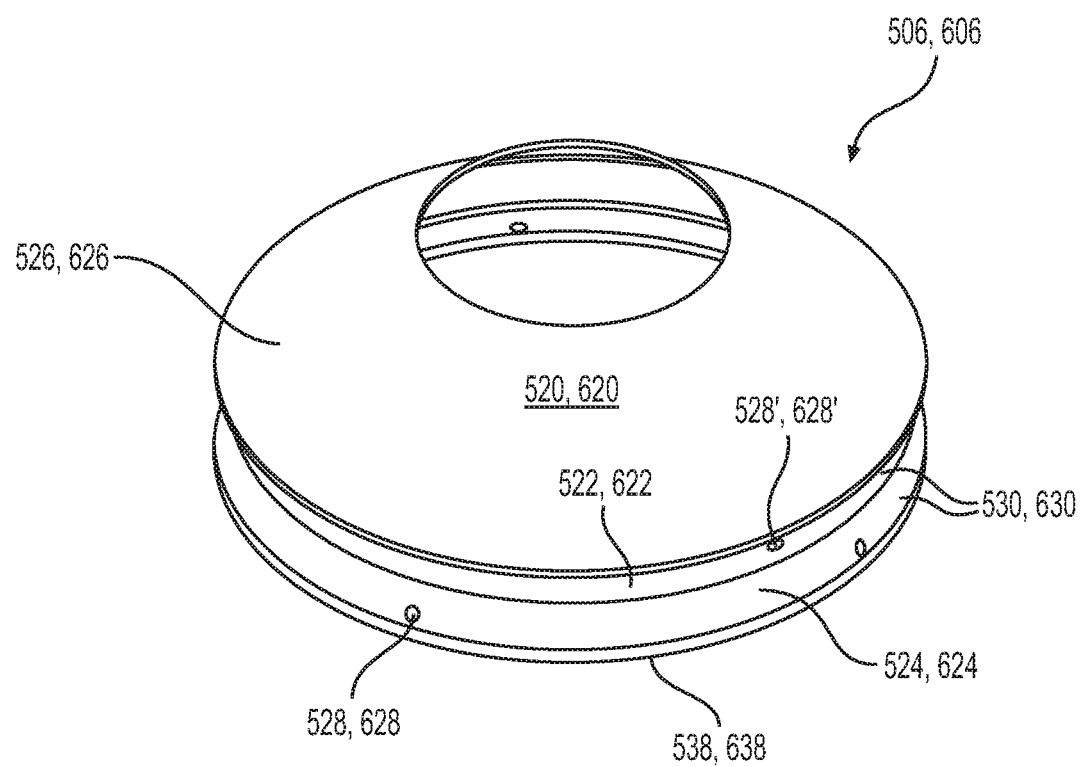
FIG. 10 is a perspective view of a top bell member of the combustion chamber subassemblies of FIGS. 6 thru 9.

Alternatively, as shown in FIGS. 8 and 9, the combustion chamber subassembly 600 may be increased in size, as would be the case for the large sized blower and heat exchanger assembly 400, by using a bottom member 610 that is cylindrically shaped instead of bell shaped (may be referred to as a cylindrical bottom member 612). This bottom member also has a bottom exit aperture 614 at its bottom portion (see FIG. 9) to allow the egress of exhaust gases and heated air. An enlarged exhaust aperture 434 on the bottom cover 602 is provided that is used with a larger exhaust channel 432 to accommodate the increase in air and exhaust gas throughput provided by a large sized blower and heat exchanger assembly 400.

As will be described in more detail momentarily, the top bell member 506, 606 and any form of the bottom member 510, 610 are formed by a sheet metal forming or bending process that maintains a consistent material thickness. Therefore, the top bell member 506, 606 and bottom member 510, 610 define hollow interiors 518, 618 that serve as a portion of the combustion chamber 516, 616.

Figure 11:
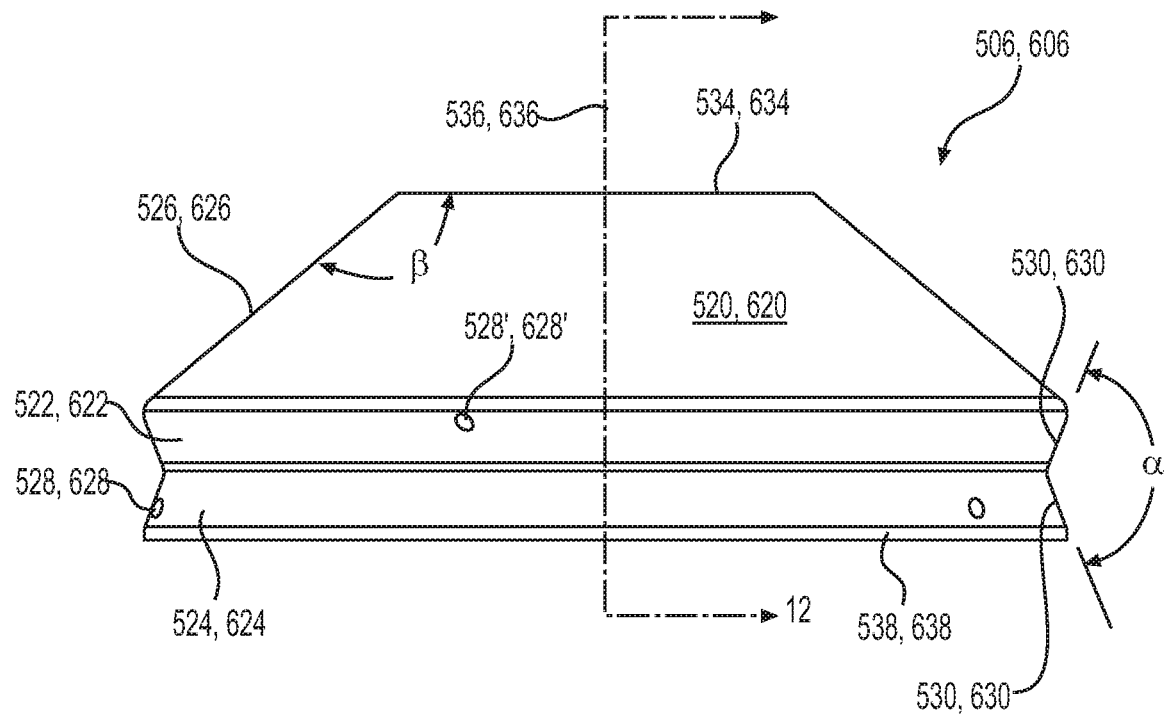
FIG. 11 is a front view of the top bell member of FIG. 10.
Figure 12:
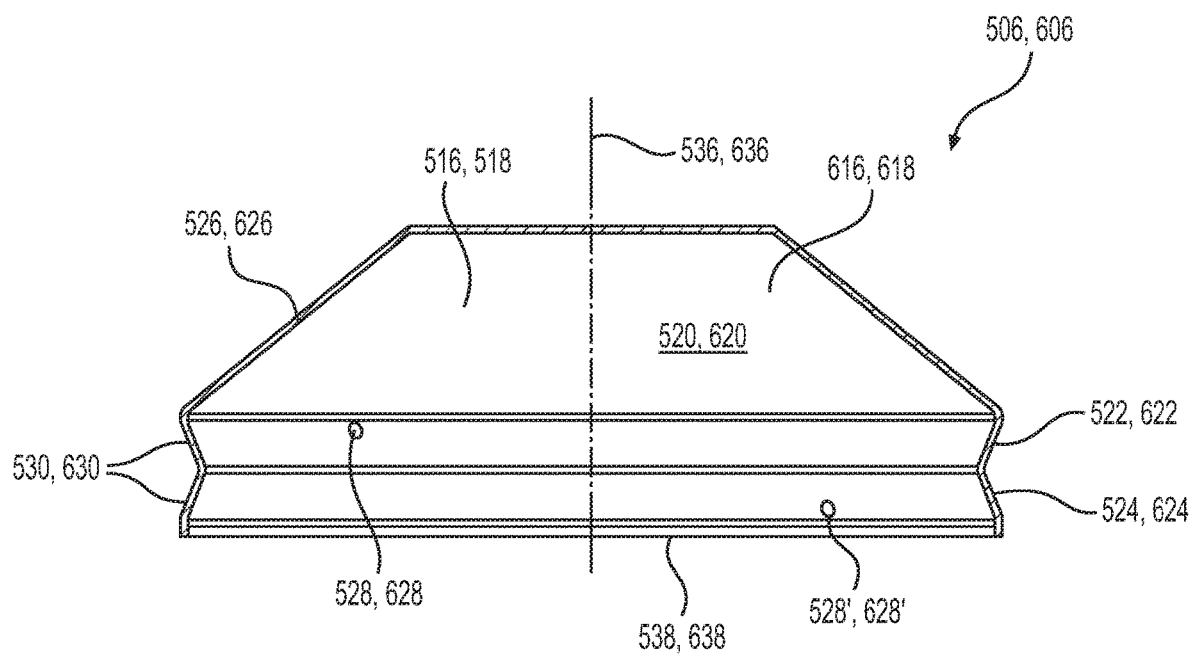
FIG. 12 is a cross-sectional view of the top bell member of FIG. 11 taken along lines 12-12 thereof.

Referring now to FIGS. 6, 8, 10, 11 and 12, the construction of the top bell member 506, 606 can be described in further detail. The top bell member 506, 606 includes a top diffuser wall 520, 620, a first sidewall 522, 622 extending from the top diffuser wall 520, 620 toward the interior 518, 618 of the combustion chamber 516, 616 of the top bell member 506, 606, and a second side wall 524, 624 extending from the first side wall 522, 622 toward the exterior 526, 626 of the top bell member 506, 606. A plurality of holes 528, 628 are provided that alternate from the first side wall 522, 622 to the second side wall 524, 624 and that are spaced away from each other along the perimeter 530, 630 of the top bell member 506, 606. These holes 528, 628 are used in conjunction with rivets 508, 608 as described earlier herein to allow the gasket 700 to be attached to the top bell member 506, 606. In some embodiments, six or seven rivets that are evenly spaced about the perimeter 530, 630 may be used. FIG. 12 shows the top bell member 506, 606 in cross-section and illustrates how the formed sheet metal maintains a consistent material thickness, defining an interior 518, 618 that forms a portion of the combustion chamber 516, 616. Again, it is to be understood that the bottom members 510, 610 are similarly constructed in FIGS. 6 thru 9.

In more general terms, a combustion chamber subassembly 500, 600 for use with a pressure washer 100, 200 according to an embodiment of the present disclosure may be described as follows with reference to FIGS. 6 thru 12. The combustion chamber subassembly 500, 600 may comprise a cover 532, 632, a top bell member 506, 606 defining an interior combustion chamber 516, 616 and an exterior 526, 626, the top bell member 506, 606 including a top diffuser wall 520, 620, a first side wall 522, 622 extending from the top diffuser wall 520, 620 toward the interior combustion chamber 516, 616 of the top bell member 506, 606, a second side wall 524, 624 extending from the first side wall 522, 622 toward the exterior 526, 626 of the top bell member 506, 606, and a gasket 700 that is attached to the top bell member 506, 606, contacting the first side wall 522, 622 and the second sidewall 524, 624 (best seen in FIG. 15). The cover 532, 632 may take any form and may be disposed at the top or bottom of the heat exchanger subassembly as needed or desired. For example, the top and bottom covers 326, 426, 502, 602 as previously described may be made as a unitary piece to provide the cover 532, 632, etc. In many embodiments, the cover 532, 632 and top bell member 506, 606 are attached to each other using a suitable method such as swaging, fastening, or the like.

As can be best seen in FIG. 11, the first side wall 522, 622 of the top bell member 506, 606 forms an exterior obtuse angle α with the second side wall 524, 624 of the top bell member 506, 606 ranging from 130 degrees to 140 degrees. In some embodiments, this angle α may be approximately 136 degrees. Similarly, the top diffuser wall 520, 620 forms an included obtuse angle β with the top edge 534, 634 of the top bell member 506, 606 that ranges from 135 degrees to 145 degrees. In some embodiments, this angle β may be approximately 141 degrees. These angles may be varied as needed or desired in other embodiments.

FIGS. 5, 10 thru 12 illustrate that the cover 532, 632 and top bell member 506, 606 each have an annular shape, sharing the same axis of revolution 536, 636. That is to say, the cover 532, 632 and the top bell member 506, 606 are formed geometrically by rotating a cross-section around a common axis 536, 636. The top bell member 506, 606 further comprises a third side wall 538, 638 extending along a direction parallel with the axis 536, 636 (see FIGS. 10 thru 12).

Figure 15:
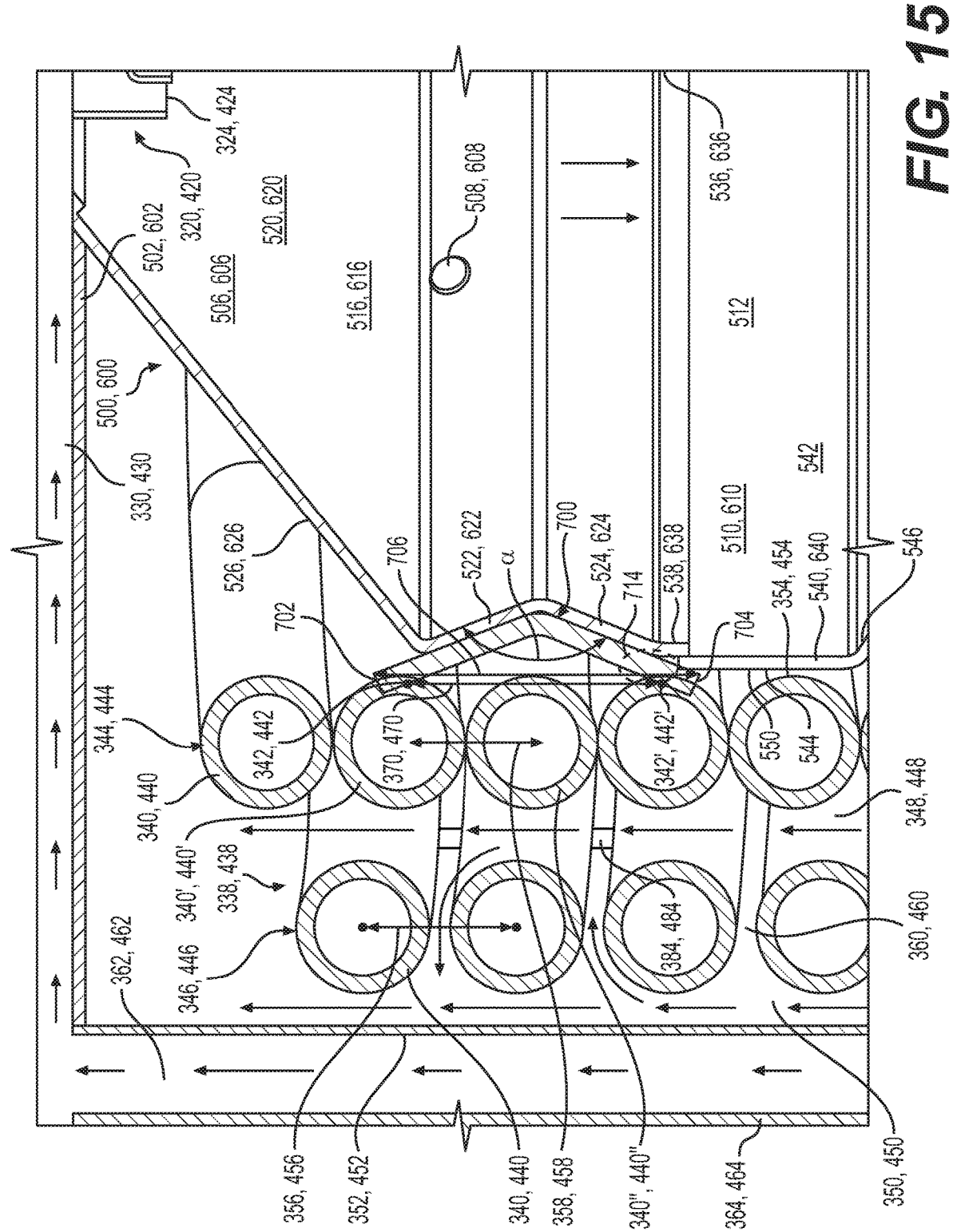
FIG. 15 is a cross-sectional view of a portion of the heat exchanger subassembly of FIG. 3 or 4, illustrating the use of a gasket disposed between the top bell member of the combustion chamber subassembly and the inner coil of heat exchange tubing according to an embodiment of the present disclosure.

Referring now to FIGS. 6, 8 and 15, the combustion chamber subassembly 500, 600 further comprises a bottom member 510, 510 including a fourth side wall 540, 640 extending along a direction parallel with the axis 536, 636 and contacting the exterior 526, 626 of the top bell member 506, 606 on the third side wall 538, 638.

For the embodiment shown in FIGS. 6 and 7, the bottom member 510 is a bottom bell member 512 having an annular shape sharing the same axis of revolution 536 as the cover 532 and top bell member 506. The bottom bell member 512 also defines an interior 542 and an exterior 544 and the interior 542 forms part of the combustion chamber 516. The bottom diffuser wall 546 extends from the fourth side wall 540 toward the interior 542 of the bottom bell member 512. The bottom diffuser wall 546 forms a bottom included obtuse angle φ with the bottom edge 548 of the bottom bell member 512 that ranges from 145 degrees to 155 degrees and may be approximately 150 degrees in some embodiments. This angle may be varied as needed or desired in other embodiments.

In FIG. 8, the bottom member 610 has an annular shape defining an axis of revolution coincident with the axis of revolution 636 of the cover 632 and the top bell member 606. This bottom member 610 has a substantially hollow cylindrical shape forming a hollow cylindrical bottom member 612, defining an exterior 644 and an interior 642. The interior 642 forms a portion of the combustion chamber 616 as previously described earlier herein.

Figure 13:
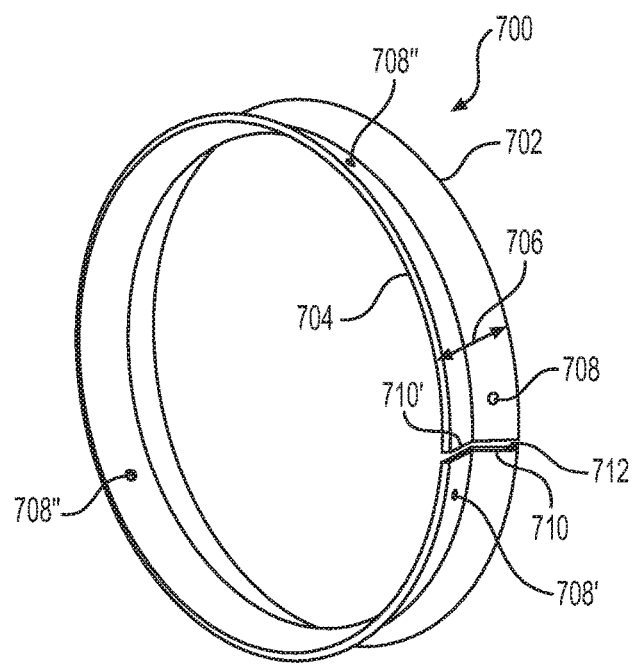
FIG. 13 is a perspective view of a gasket according to an embodiment of the present disclosure.

Focusing on FIGS. 13 and 15, the gasket 700 includes an upper axial extremity 702, a lower axial extremity 704, and defines an axial length 706 measured from the upper axial extremity 702 to the lower axial extremity 704 ranging from 1.5" to 2.0" when installed. The gasket 700 may be made from a material that is flexible and is riveted to the top bell member 506, 606. For example, a gasket 700 that is made from a material sold under the TRADENAME of INCONEL or FIBERFRAX L-144 may be used. Table I below gives some of the desirable properties of this material as measured using material testing methods. It is to be understood that this material is given by way of example and not in any limiting sense.

TABLE I

Material Test Report for Ceramic Fiber Tape

| | Thickness 3.0 mm | |
| --- | --- | --- |
| Test Content | Unit | Value |
| $AL_2O3 + SIO_2$ | % | 97.13 |
| $AL_2O_3$ | % | 45.7 |
| $Fe_2O_3$ | % | 0.87 |
| $CaO + Na_2O$ | % | 0.43 |
| Loss on Ignition | % | 14 |
| Rated Temperature | °C. | >1100 |
| Max. Use Temperature | °C. | 1260 |
| Moisture Content | % | 0.2 |
| Fiber OD | μm | 2-4 |

While FIG. 13 shows the configuration of the gasket 700 when installed, it is to be understood that the gasket 700 is made from a flat piece of material or tape that is cut to length and has rivet apertures 708 cut into it for receiving rivets 508, 608 through the rivet apertures 708 when attaching the gasket 700 to the top bell member 506, 606 (apertures 708 of the gasket 700 would line up with the holes 528, 628 in the top bell member 506, 606 for receiving the rivets 508, 608). The gasket 700 as installed conforms to the side walls 522, 524, 622, 624 of the top bell member 506, 606. Thus, the gasket 700 will have an circular annular shape as shown in FIG. 13 when installed and six rivet apertures 708 are provided spaced apart from each other circumferentially by 60 degree to 72 degree intervals. Since the gasket 700 is cut to length, the gasket 700 has circumferential ends 710, 710' that are adjacent each other when installed, creating a small gap 712 between the ends 710, 710'. Two rivet apertures 708, 708' are placed near each end 710, 710' to help provide a consistent seal around the perimeter of the gasket 700. The configuration of the gasket 700 and the spacing of the rivet apertures 708 may be as needed or desired.

As depicted by FIG. 15, when the gasket 700 is installed and the heat exchanger subassembly 302, 402 completed, the lower axial extremity 704 of the gasket 700 contacts the fourth side wall 540 of the bottom member 510 on the exterior 550 of the bottom member 510, causing the gasket 700 to expand locally (denoted by bulge 714) to provide a fluid tight seal. In other words, the lower axial extremity 704 may roll up slightly when contacting the heat exchange tubing causing the gasket to bulge locally. This added compression may aid the sealing function. Also, the upper axial extremity 702 of the gasket 700 may periodically contact each successive pitch 340, 440 of the heat exchange tubing 338, 438 and bend out of the way during assembly. The upper axial extremity 702 passes each particular pitch 340, 440 of the heat exchange tubing 338, 438 until the upper axial extremity 702 contacts and seals an upper pitch 340', 440' of the heat exchange tubing 338, 438 after the assembly process is completed. Thus, two points of contact or sealing points 342, 342', 442, 442' are employed, providing redundancy.

A blower and heat exchanger assembly 300, 400 according to an embodiment of present disclosure will now be described with reference to FIGS. 3 thru 15. The blower and heat exchanger assembly 300, 400 may comprise a blower subassembly 308, 408 (see FIGS. 3 and 4), a support frame 304, 404 (see FIGS. 3, 4 and 14), and a heat exchanger subassembly 302, 402 (see FIGS. 3, 4, 14 and 15). The heat exchanger subassembly 302, 402 may include a combustion head subassembly 320, 420 (see FIGS. 5 and 14), a combustion chamber subassembly 500, 600 (see FIGS. 5 thru 9 and 15), an inner shell 352, 452 (see FIGS. 14 and 15, may also be referred to as an inner wrap), an inner coil 344, 444 of heat exchange tubing 338, 438 (see FIGS. 14 and 15), and an outer coil 346, 446 of heat exchange tubing 338, 438 (see FIGS. 14 and 15).

Focusing on FIG. 15, the heat exchanger subassembly 302, 402 defines a first flow passage 348, 448 between the inner coil 344, 444 of heat exchange tubing 338, 448 and the outer coil 346, 446 of heat exchange tubing 338, 438, a second flow passage 350, 450 between the outer coil 346, 446 of heat exchange tubing 338, 438 and the inner shell 352, 452, and a sealed passage 354, 454 between the combustion chamber subassembly 500, 600 and the inner coil 344, 444 of heat exchange tubing 338, 438. Heated air and exhaust gases pass down out of the exhaust aperture 334, 434 of the bottom member 510, 610 (not shown in FIG. 15) of the combustion chamber subassembly 500, 600 toward the bottom of the heat exchanger and are forced radially outwardly and then axially upwardly into the first and second flow passages 348, 350, 448, 450. Since the sealed passage 354, 454 prevents exhaust gases and heated air from bypassing the outer coil 346, 446 of heat exchange tubing 338, 438, the efficiency of the heat exchanger may be increased. In some cases, flow from the first flow passage 348, 448 may pass radially between the successive pitches 340, 440 of the outer coil 346, 446 of heat exchange tubing 338, 438 to the second flow passage 350, 450, and vice versa from the second flow passage 350, 450 to the first flow passage 348, 448, improving heat transfer. To that end, the pitch distance 356, 456 of the outer coil 346, 446 of heat exchange tubing 338, 438 may be greater than the pitch distance 358, 458 of the inner coil 344, 444 of heat exchange tubing 338, 438 to provide a space 360, 460 between the successive pitches of the outer coil, allowing cross-flow.

Figure 14:
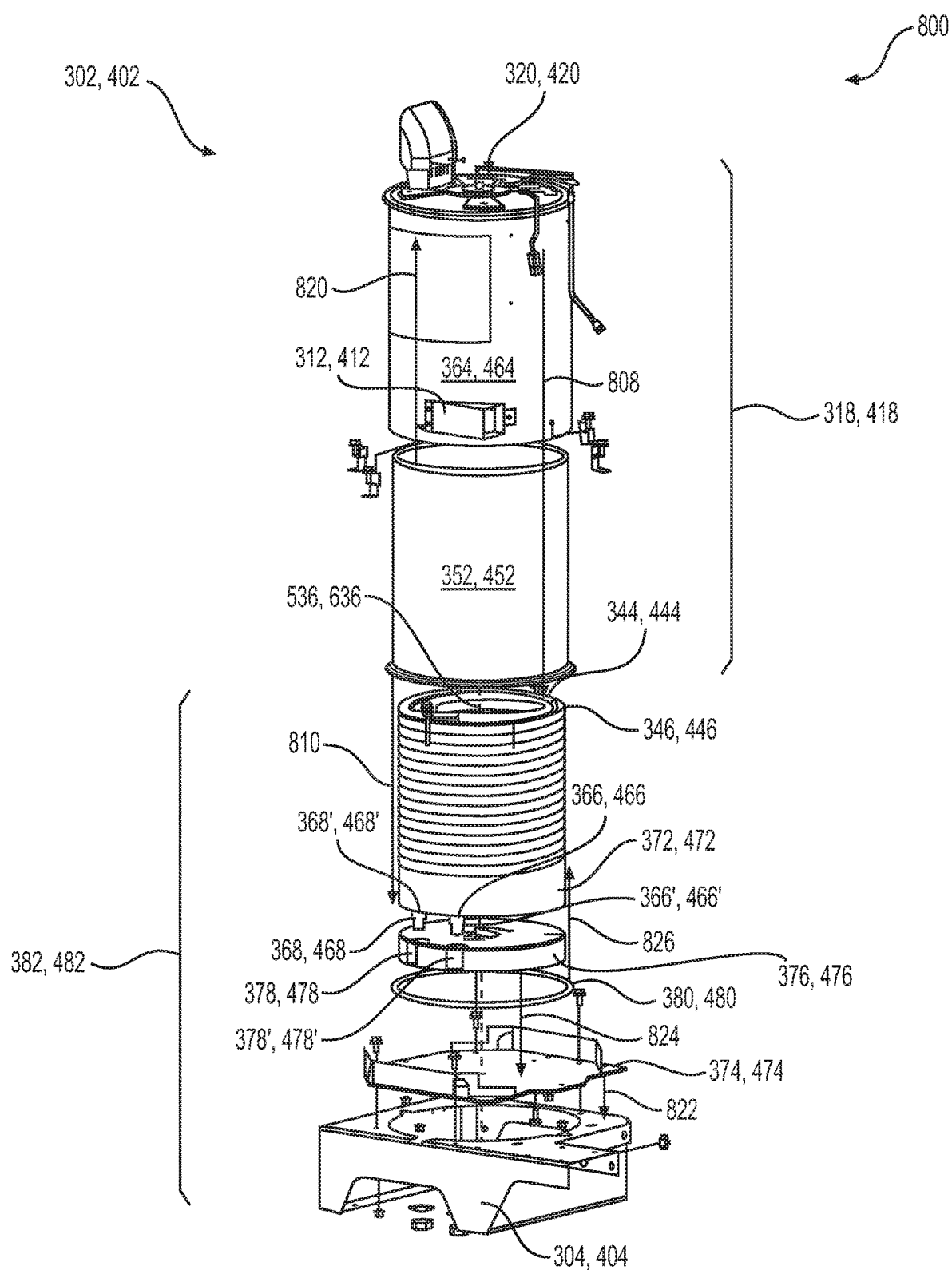
FIG. 14 is an exploded assembly view of the heat exchanger subassembly of FIG. 3 or FIG. 4.

An outer air intake passage 362, 462 is also formed between the inner shell 352, 452 and the outer shell 364, 464 (may also be referred to as an outer wrap). This outer air intake passage 362, 462 is connected to the blower 310, 410 via the duct 312, 412 as previously described with reference to FIGS. 3 and 4 (duct 312, 412 is also shown in FIG. 14). As the intake air flows upward it eventually reaches the flow passage 330, 430 formed between the top cover 326, 426 and bottom cover 502, 602 described previously herein with reference to FIG. 5. The inner shell 352, 452 is attached to the bottom surface of the bottom cover 502, 602, isolating the first and second flow passages 348, 448, 350, 450 from the outer air intake passage 362, 462. Similarly, the outer shell 364, 464 is attached to the top cover 326, 426, isolating the outer air intake passage 362, 462 from the atmosphere.

Figure 17:
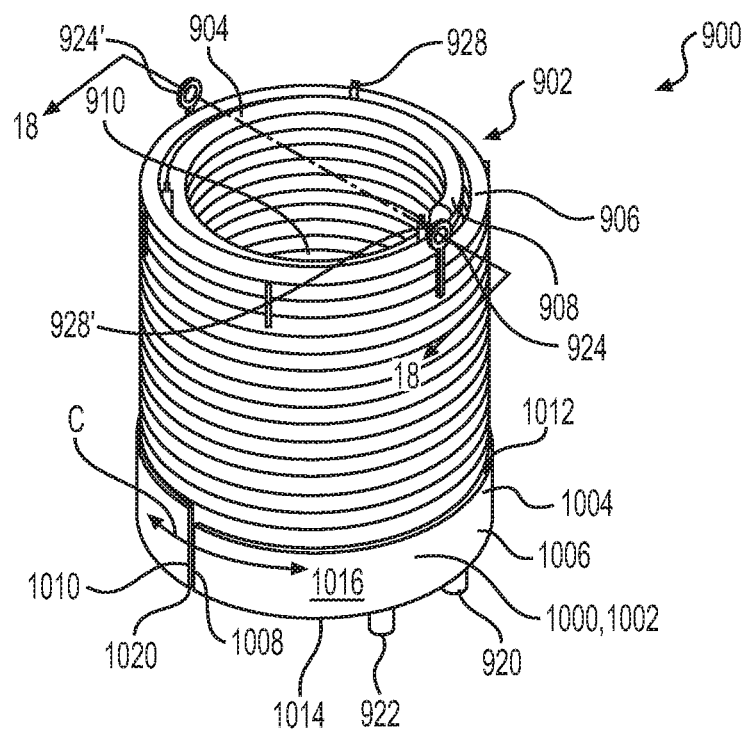
FIG. 17 is a perspective view of the heat exchange tubing and base ring (may be referred to as the coil subassembly) of a heat exchanger subassembly that is medium sized. The base ring has an essentially solid configuration.
Figure 20:
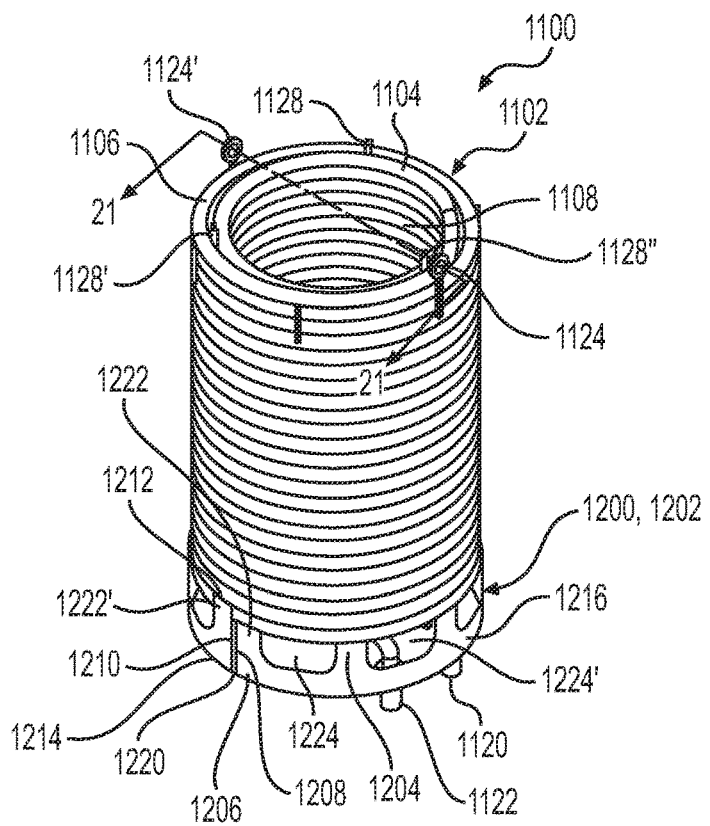
FIG. 20 is a perspective view of the heat exchange tubing and base ring (may be referred to as the coil subassembly) of a heat exchanger subassembly that is large sized. The base ring has a notched configuration.

With continued reference to FIGS. 14 and 15, the inner and outer coils 344, 346, 444, 446 of heat exchange tubing 338, 438 may be formed by winding a single piece of tubing about a mandrel until the entire inner coil 344, 444 has been formed to a desired axial length. Then, spacers 928, 1128 (as shown in FIGS. 17 and 20) may be placed on the radially outer portions of the inner coil 344, 444 and the same single piece of tubing may be wound in the opposite axial direction onto the spacers 928, 1128 (as shown in FIGS. 17 and 20) to form the outer coil 346, 446. The spacer 384, 484 shown in FIG. 15 is actually attached to the outer coil 346, 446, spacing the heat exchange tubing 338, 438 from the inner shell 352, 452. An inlet 366, 466 to the tubing for allowing the ingress of cleaning fluid such as water and outlet 368, 468 from the tubing extends downwardly from the tubing. The inner coil 344, 444 and outer coil 346, 446 of heat exchange tubing 338, 438 has a helical configuration, defining an axis of revolution 536, 636 and an inner pitch distance 358, 458 and an outer pitch distance 356, 456 that may be the same or different from each other.

As best seen in FIG. 15, the gasket 700 is trapped or compressed between combustion chamber subassembly 500, 600 and the inner coil 344, 444 of heat exchange tubing 338, 438, contacting the inner coil 344, 444 of heat exchange tubing 338, 438 at two different axial locations. In some embodiments, the two different axial locations 342, 342', 442, 442' are spaced away from each other a predetermined distance 370, 470 that is at least equal to the pitch distance 358, 458 of the inner coil 344, 444 of the heat exchange tubing 338, 438. In many embodiments, this predetermined distance 370, 470 is equal to approximately twice the inner pitch distance 358, 458. The top bell member 506, 606 that includes a first side wall 522, 622 and a second side wall 524, 624 that form an obtuse angle α relative to each other, and the gasket 700 is attached to the top bell member 506, 606 and is flexible, conforming to the two side walls 522, 524, 622, 624. Consequently, as installed, the gasket 700 has a generally V-shaped cross-section. Other configurations of the gasket 700 when installed are possible.

As also shown in FIG. 15, the gasket 700 may extend axially past the first side wall 522, 622 along a first axial direction (parallel to axis 536, 636) toward the top of the heat exchanger subassembly 302, 402 and past the second side wall 524, 624 in a second axial direction toward the bottom of the heat exchanger subassembly 302, 402 that is opposite the first axial direction. This construction allows the upper and lower axial extremities 702, 704 of the gasket 700 to be flexible when contacting the inner coil 344, 444 of heat exchange tubing 338, 438. It is contemplated that in other embodiments only one coil of heat exchange tubing 338, 438 may be employed.

Figure 16:
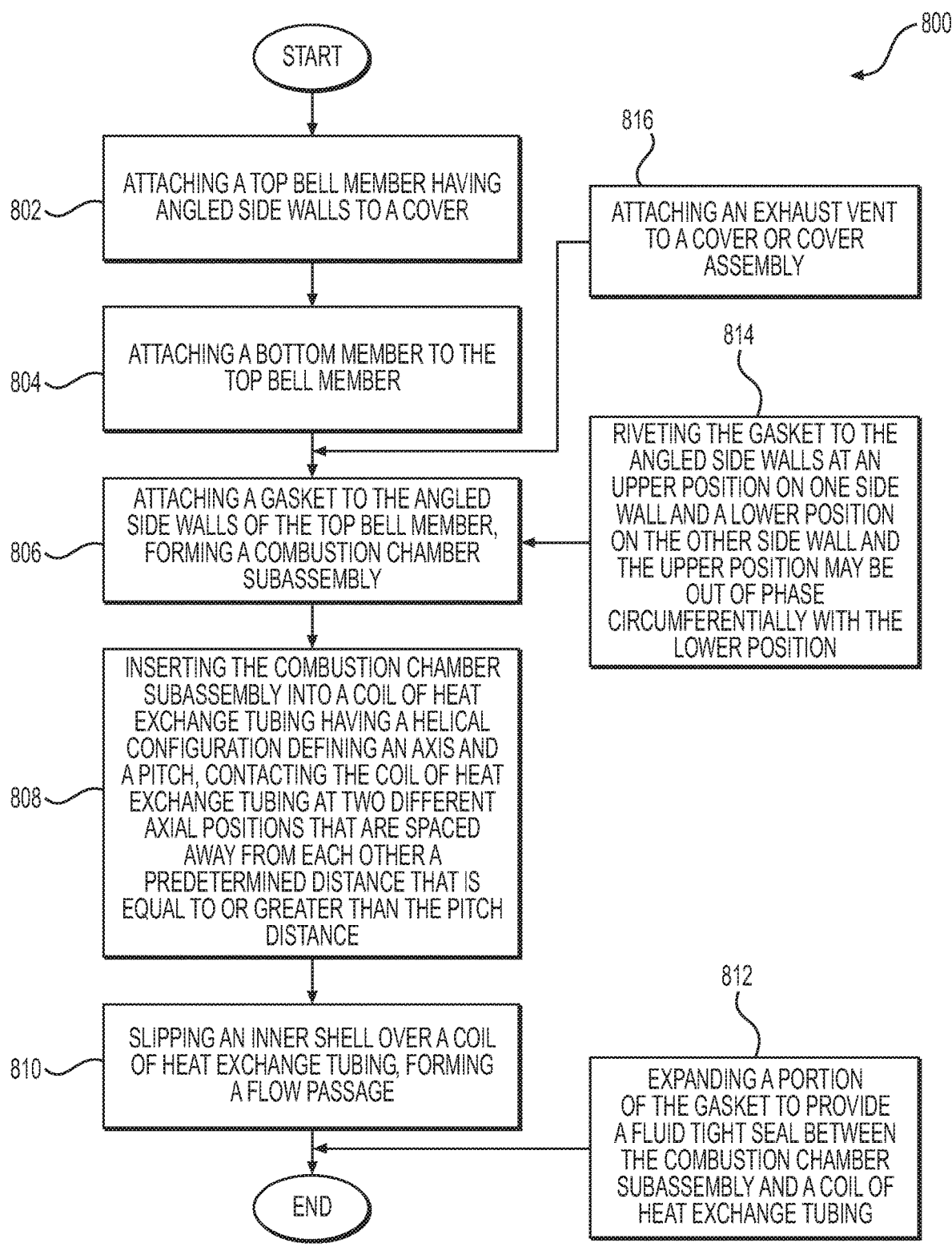
FIG. 16 is a flow chart depicting a method of assembling a heat exchanger subassembly according to an embodiment of the present disclosure.

The method 800 of assembling the heat exchanger subassembly 302, 402 may be understood with reference to FIGS. 14 and 16. The method of assembling a heat exchanger subassembly 302, 402 may comprise attaching a top bell member 506, 606 having angled side walls 522, 524, 622, 624 to a cover such as bottom cover 502, 602 (step 802) (see FIG. 16), attaching a bottom member 510, 610 to the top bell member 506, 606 (see FIG. 16) (step 804), and attaching a gasket 700 to the angled side walls 522, 524, 622, 624 of the top bell member 506, 606, forming a combustion chamber subassembly 500, 600 (step 806).

The method 800 may further comprise inserting the combustion chamber subassembly 500, 600 into a coil subassembly 900, 1100 of heat exchange tubing 338, 438 having a helical configuration defining an axis and a pitch, contacting the coil of heat exchange tubing at two different axial positions that are spaced away from each other a predetermined distance that is equal to or greater than the pitch distance (step 808, see FIGS. 14 and 16).

The method 800 may further comprising slipping an inner shell 352, 452 over a coil subassembly 900, 1100 of heat exchange tubing 338, 438, forming a flow passage (step 810, see FIGS. 14 and 16). In some embodiments as described earlier herein, this may occur after the inner shell 352, 452 has been attached to the cover such as bottom cover 502, 602 of the combustion chamber subassembly 500, 600.

The method 800 may further comprise expanding a portion of the gasket 700 to provide a fluid tight seal between the combustion chamber subassembly 500, 600 and a coil subassembly 900, 1100 of heat exchange tubing 338, 438 (step 812) (see FIG. 16).

Moreover, the step 806 of attaching the gasket 700 to the angled side walls 522, 524, 622, 624 of the top bell member 506, 606 may include riveting the gasket 700 to the angled side walls 522, 524, 622, 624 at an upper position on one side wall such as the first side wall 522, 622 and a lower position on the other side wall such as the second side wall 524, 624 and the upper position may be out of phase circumferentially with the lower position (step 814). Other forms of attachment may be used.

Looking now at FIGS. 5 and 14, the method 800 of assembly may be further characterized as follows. The combustion chamber subassembly 500, 600 is installed into the coil subassembly 900, 1100 (step 808). Then, the inner shell 352, 452 is slipped over the coil subassembly 900, 1100 and combustion chamber subassembly 500, 600. Next, the outer shell 364, 464 is installed over inner shell 352, 452 (step 810). Last, the top cover 326, 426 may be installed onto outer shell 364, 464 (step 818). Moreover, the upper portion 318, 418 of the heat exchanger subassembly 302, 402 may be assembled by attaching the combustion head subassembly 320, 420 to the top cover 326, 426 (step 816, see FIG. 5), attaching the top cover 326, 426 to the bottom cover 502, 602 of the combustion chamber subassembly 500, 600 (step 818, see FIG. 5). The method 800 may further comprise attaching an exhaust vent to a cover or a cover assembly (see step 816 in FIG. 16).

The bottom portion 382, 482 of the heat exchanger subassembly 302, 402 is assembled by attaching a base ring 372, 472 to the bottom of the heat exchange tubing 338, 438 (shown already attached in FIG. 14), such as previously welding the base ring 372, 472 to the heat exchange tubing 338, 438. An attachment bracket 374, 474 is attached to the support frame 304, 404 (step 822) and a firebrick member 376, 476 is placed onto the attachment bracket 374, 474 (step 824). The firebrick member 376, 476 has notches 378, 478 on its periphery to allow the inlet 366, 466 and outlet 368, 468 of the tubing to pass and be accessed. A seal 380, 480 is inserted to surround the base ring 372, 472 to help prevent leakage (step 826). The top portion 318, 418 of the heat exchanger subassembly 302, 402 is then attached to the lower portion 382, 482 of the heat exchanger subassembly 302, 402. As this is done, the combustion chamber subassembly 500, 600 passes past the inner coil 344, 444 of tubing until the outer shell 364, 464 contacts the attachment bracket 374, 474 and a proper seal has been established between the gasket 700 and the inner coil 344, 444 of heat exchange tubing 338, 438. Now, the heat exchanger subassembly 302, 402 is mounted onto the support frame 304, 404 and the blower subassembly 308, 408 is also mounted onto the support frame 304, 404, yielding a blower and heat exchanger assembly 300, 400 that may be mounted onto a skid mounted pressure washer 100 or a trailer mounted pressure washer 200.

Figure 23:
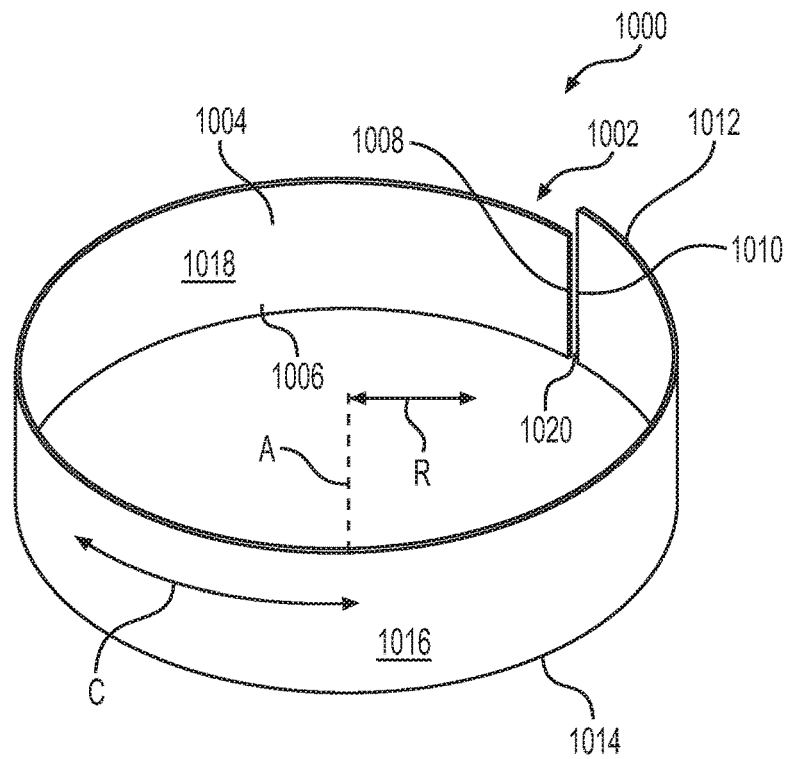
FIG. 23 is a perspective view of the base ring used in the coil subassembly of FIG. 17. This base ring lacks notches.

Looking at FIGS. 17 thru 19, a coil subassembly 900 that may be used with a heat exchanger of a pressure washer, such as that shown in FIG. 3, will now be described. More specifically, this coil subassembly 900 may be used with a heat exchanger subassembly 302 of medium size as previously described. The coil subassembly 900 may comprise a length of heat exchange tubing 902 including an inner coil 904 and an outer coil 906, and a base ring 1000 attached to the length of heat exchange tubing 902. The base ring 1000 may include discrete or separate bodies or a single, unitary body depending on the application. For the embodiment shown in FIGS. 17 thru 19, the base ring 1000 includes, as best seen in FIG. 23, a unitary sheet body 1002 comprising a top portion 1004, a bottom portion 1006, a first end 1008 connecting the top portion 1004 to the bottom portion 1006, and a second end 1010 connecting the bottom portion 1006 to the top portion 1004. The top portion 1004 includes an uninterrupted angled top edge 1012 and the bottom portion 1006 includes an uninterrupted bottom support edge 1014 that is straight. Put another way, the top edge 1012 is not parallel or is angled to the bottom support edge 1014.

Figure 18:
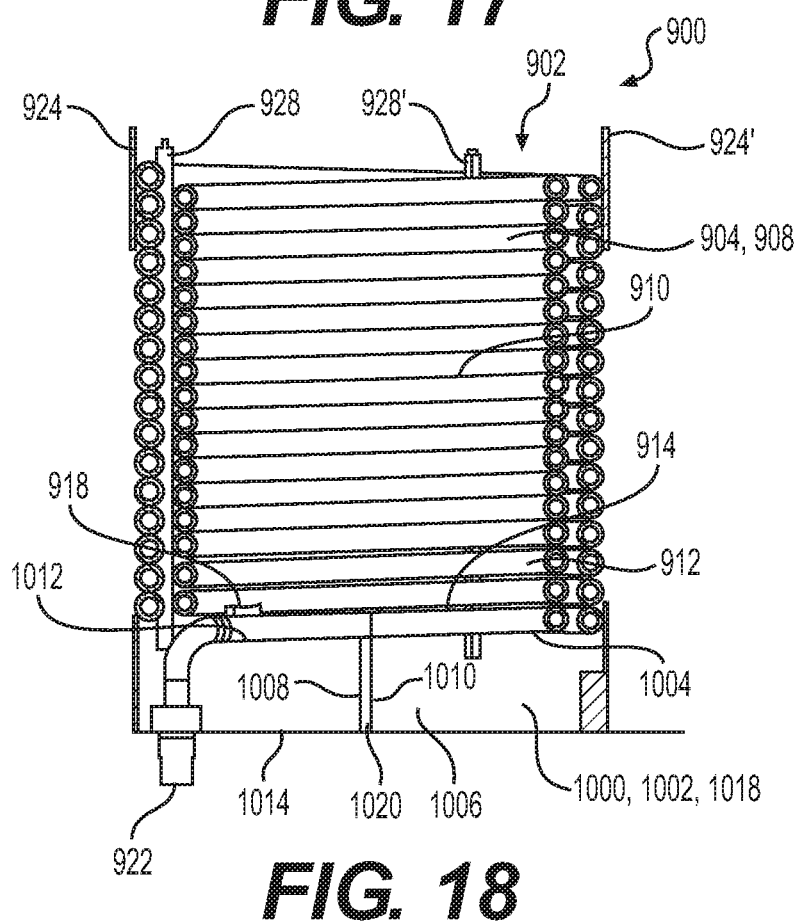
FIG. 18 is a cross-sectional view of the coil subassembly of FIG. 17, taken along lines 18-18 thereof.
Figure 19:
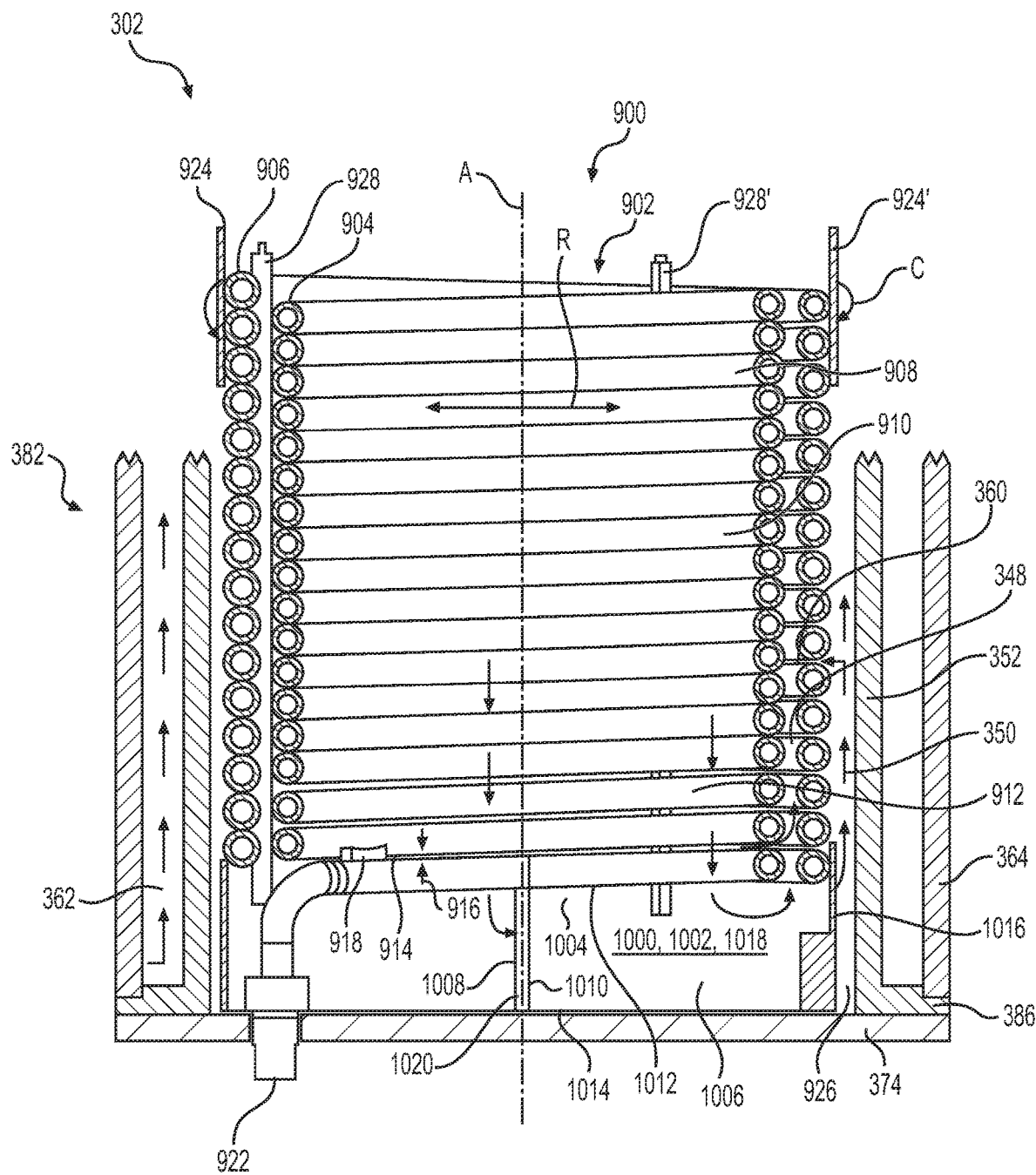
FIG. 19 is cross-sectional view of a portion of the heat exchanger subassembly using the coil subassembly of FIG. 17, illustrating the heated air and exhaust flow near the bottom portion of the heat exchanger as well as upward flow of the intake air more clearly.

With continued reference to FIG. 23, the base ring 1000 is formed into a cylindrical configuration, defining radial R, circumferential C, and axial A directions and the angled top edge 1012 is attached to the length of heat exchange tubing (see FIGS. 17 thru 19). More particularly, the angled top edge 1012 is attached to the outer coil 906 of heat exchange tubing 902. The angled top edge 1012 follows the helical pitch of the outer coil 906 of heat exchange tubing 902.

As best seen in FIGS. 18 and 19, the inner coil 904 defines a top portion 908, an intermediate portion 910, and a bottom portion 912, each portion having a series of successive pitches along a cylindrical axis (such as A). The pitch of the bottom portion 912 is increased as compared to the pitch of the top and intermediate portions 908, 910, creating a slot 914 between the pitches of the heat exchange tubing 902 of the bottom portion 912, allowing air to pass through the slot 914. The slot 914 defines an axial distance 916 ranging from 0.13" to 0.34". An axial spacer 918 may be used to help establish the axial distance 916 of the slot 914.

Looking at FIGS. 18, 19 and 23, the body 1002 of the base ring 1000 includes an outer cylindrical surface 1016, an inner cylindrical surface 1018, and defines a gap 1020 between the first end 1008 and the second end 1010 of the base ring sheet body 1002 that are disposed adjacent each other circumferentially, the gap 1020 being less than half an inch measured circumferentially. The length of heat exchange tubing 902 includes an inlet 920 and an outlet 922 extending axially from the length of heat exchange tubing 902, being disposed radially within the base ring 1000.

FIGS. 17 thru 19, illustrate that a pair of lifting eyes 924 may be provided to allow the coil subassembly 900 to be lifted, facilitating assembly and disassembly into the heat exchanger subassembly 302. A plurality of radial spacers 928 are provided as alluded to earlier herein, to space the inner coil 904 from the outer coil 906 establishing the first flow passage 348. A plurality of outer spacers 384 are also provided to space the outer coil 906 from the inner shell 352 establishing a second flow passage 350.

While the base ring 1000 without notches shown in FIGS. 17 thru 19 is satisfactory for use with a medium sized heat exchanger 302, especially if a combustion chamber gasket 700 is used, further improvement for a large sized heat exchanger 402 is sometimes warranted. Regardless, the notched base ring 1200 as shown and described with reference to FIGS. 20 thru 22, may also be used with the embodiments shown in FIGS. 17 thru 19 if so desired or needed.

Focusing on FIG. 19, the coil subassembly 900 is shown assembled into the lower portion 382 of a heat exchanger subassembly 302. The gap 1020 between the ends 1008, 1010 of the base ring 1000 allows for limited flow of air from the interior of the inner coil 904 of the length of heat exchange tubing 902 to an annular chamber 926, located between the inner shell 352 and the base ring 100, which leads to the second flow passage 350, allowing air to flow axially along outer radial portion of the outer coil 906, increasing slightly the flow rate in this area and increasing heat transfer efficiency. As mentioned previously herein, the air in the first flow passage 348 may flow axially upwards and also radially toward the second flow passage 352 through the space 360 provided between the pitches of the outer coil 906. The air intake flow is also illustrated that takes place as air enters into the outer air intake passage 362 from the duct 312 (see FIG. 3) and flows axially upward. Slot 914 allows air to enter the first flow passage 348. The inner shell 352 is shown to be resting on the attachment bracket 374 and the outer shell 364 is shown to be resting on a lip 386 of the inner shell 352. It is contemplated that the inner and outer shells 352, 364 may both rest directly on the attachment bracket 374 in other embodiments, etc.

Figure 21:
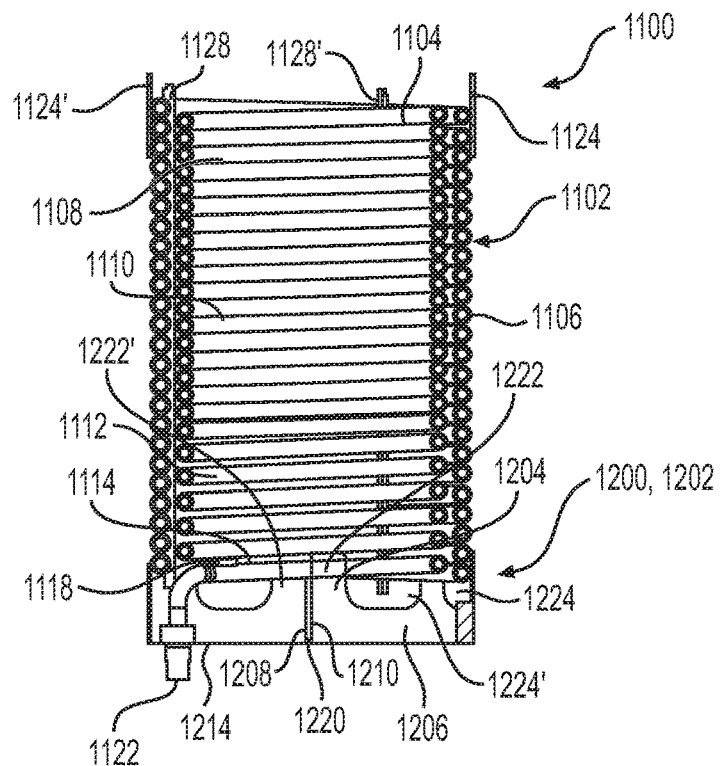
FIG. 21 is a cross-sectional view of the coil subassembly of FIG. 20, taken along lines 21-21 thereof.
Figure 22:
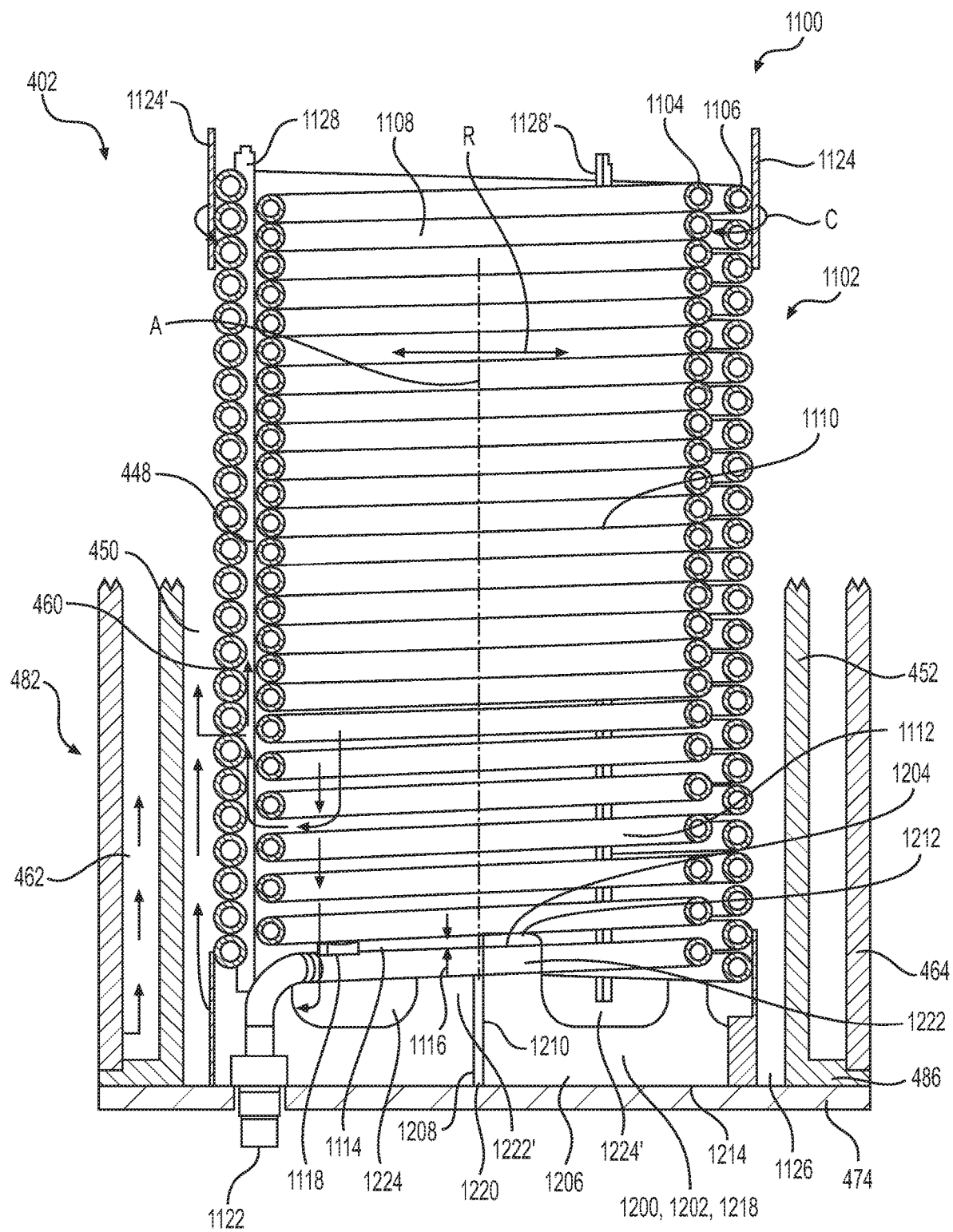
FIG. 22 is cross-sectional view of a portion of the heat exchanger subassembly using the coil subassembly of FIG. 20, illustrating the increased heated air and exhaust flow near the bottom portion of the heat exchanger as well as upward flow of the intake air more clearly.

In order to improve efficiency, FIGS. 20 thru 22 illustrate a coil subassembly 1100 for use with a large sized heat exchanger 402 of a pressure washer (such as that shown in FIG. 4) that uses a notched base ring 1200. The coil subassembly 1100 may comprise a length of heat exchange tubing 1102 including an inner coil 1104 and an outer coil 1106, and a notched base ring 1200 attached to the length of heat exchange tubing 1102. The notched base ring 1200 may include a plurality of attachment lugs 1222 attached to the length of heat exchange tubing 1102 defining a plurality of notches 1224 configured to allow the flow of air. The base ring 1200 may include a plurality of discrete members or a single, unitary sheet body 1202 as long as the notches 1224 provide enough air flow as will be explained.

For the embodiment shown in FIGS. 20 thru 22 and 24, the base ring 1200 includes a unitary sheet body 1202 comprising a top portion 1204, a bottom portion 1206, a first end 1208 connecting the top portion 1204 to the bottom portion 1206, and a second end 1210 connecting the bottom portion 1206 to the top portion 1204. The top portion 1204 includes the plurality of attachment lugs 1222 and defines the plurality of notches 1224, each notch 1224 being at least partially defined by two lugs 1222 disposed on opposite sides of the notch 1224, the top portion 1204 also including an angled top edge 1212 that is disposed at each of the attachment lugs 1222. The bottom portion 1206 includes an uninterrupted bottom support edge 1214 that is straight. Put another way, the top edge 1212 is not parallel with the bottom edge 1214, or is angled thereto.

As shown in FIGS. 20 thru 22 and 24, the notched base ring 1200 is formed into a cylindrical configuration, defining radial R, circumferential C, and axial A directions and the angled top edge 1212 of each attachment lug 1222 is attached to the length of heat exchange tubing 1102. More particularly, for this embodiment, the angled top edge 1212 of each attachment lug 1222 is attached to the outer coil 1106 of heat exchange tubing 1102. As such, the angled top edge 1212 of each attachment lug 1222 follows the helical pitch of the outer coil 1106 of heat exchange tubing 1102. Attachment may be achieved using welding or the like. Other configurations are possible.

Furthermore, the inner coil 1104 defines a top portion 1108, an intermediate portion 1110, and a bottom portion 1112, and the pitch of the bottom portion 1112 is increased as compared to the pitch of the top and intermediate portions 1108, 1110, creating a slot 1114 between the pitches of the heat exchange tubing 1102 of the bottom portion 1112, allowing air to pass through the slot 1114. The slot 1114 defines an axial distance 1116 ranging from 0.13" to 0.34". This axial distance 1116 may be established using an axial spacer 1118.

The sheet body 1202 of the notched base ring 1200 includes an outer cylindrical surface 1216, an inner cylindrical surface 1218, and defines a gap 1220 between the first end 1208 and the second end 1210 of the base ring sheet body 1202 that are disposed adjacent each other circumferentially, the gap 1220 being less than half an inch measured circumferentially. Also, the length of heat exchange tubing 1102 includes an inlet 1120 and an outlet 1122 extending axially from the length of heat exchange tubing 1102, being disposed radially within the notched base ring 1200.

A pair of lifting eyes 1124 are provided to allow the coil subassembly 1100 to be lifted, facilitating assembly and disassembly into the heat exchanger subassembly 402. A plurality of radial spacers 1128 are provided as alluded to earlier herein, to space the inner coil 1104 from the outer coil 1106 establishing the first flow passage 448. A plurality of outer spacers 484 are also provided to space the outer coil 1106 from the inner shell 452 establishing a second flow passage 450. The notched base ring 1200 may also be used with the embodiments shown in FIGS. 17 thru 19 if so desired.

Focusing on FIG. 22, the coil subassembly 1100 is shown assembled into the lower portion 482 of a heat exchanger subassembly 402. The gap 1220 between the ends 1208, 1210 of the notched base ring 1200, and more importantly, the notches 1224 allow for increased flow of air from the interior of the inner coil 1104 of the length of heat exchange tubing 1102 to an annular chamber 1126 that leads to the second flow passage 450, allowing air to flow axially along outer radial portion of the outer coil 1106, increasing significantly the flow rate in this area and increasing heat transfer efficiency. As mentioned previously herein, the air in the first flow passage 448 may flow axially upwards and also radially toward the second flow passage 450 through the space 460 provided between the pitches of the outer coil 1106. The air intake flow is also illustrated that takes place as air enters into the outer air intake passage 462 from the duct 412 (see FIG. 4) and flows axially upward. Slot 1114 allows air to enter the first flow passage 448. The inner shell 452 is shown to be resting on the attachment bracket 474 and the outer shell 464 is shown to be resting on a lip 486 of the inner shell 452. It is contemplated that the inner and outer shells 452, 464 may rest directly on the attachment bracket 474 in other embodiments, etc.

Looking now at FIG. 23, base ring 1000 without notches used in FIGS. 17 thru 19 is shown in isolation from the coil subassembly 900. The base ring 1000 may comprise a base ring sheet body 1002 including a top portion 1004, a bottom portion 1006, a first end 1008 connecting the top portion 1004 to the bottom portion 1006, and a second end 1010 connecting the bottom portion 1006 to the top portion 1004. The top portion 1004 includes an angled top edge 1012 (not perpendicular to the axis A), and an uninterrupted bottom support edge 1014 that is straight (perpendicular to the axis A). The angled top edge 1012 may mimic the helical pitch of a coil of the heat exchange tubing such as the outer coil 906 of the heat exchange tubing 902.

As shown in FIG. 23, the base ring sheet body 1002 is formed into a substantially cylindrical configuration. However, it is to be understood that initially the base ring sheet body 1002 is flat. Once the base ring sheet body 1002 is formed or bent, the body 1002 defines a radial direction R, an axial direction A, and a circumferential direction C, and includes an outer cylindrical surface 1016, an inner cylindrical surface 1018, and defines a gap 1020 between the first end 1008 and the second end 1010 of the base ring sheet body 1002 that are disposed adjacent each other circumferentially. This gap 1020 may be less than half an inch. The circumferential length from the first end 1008 to the second end 1010 may range from 43.00" to 44.00".

Figure 24:
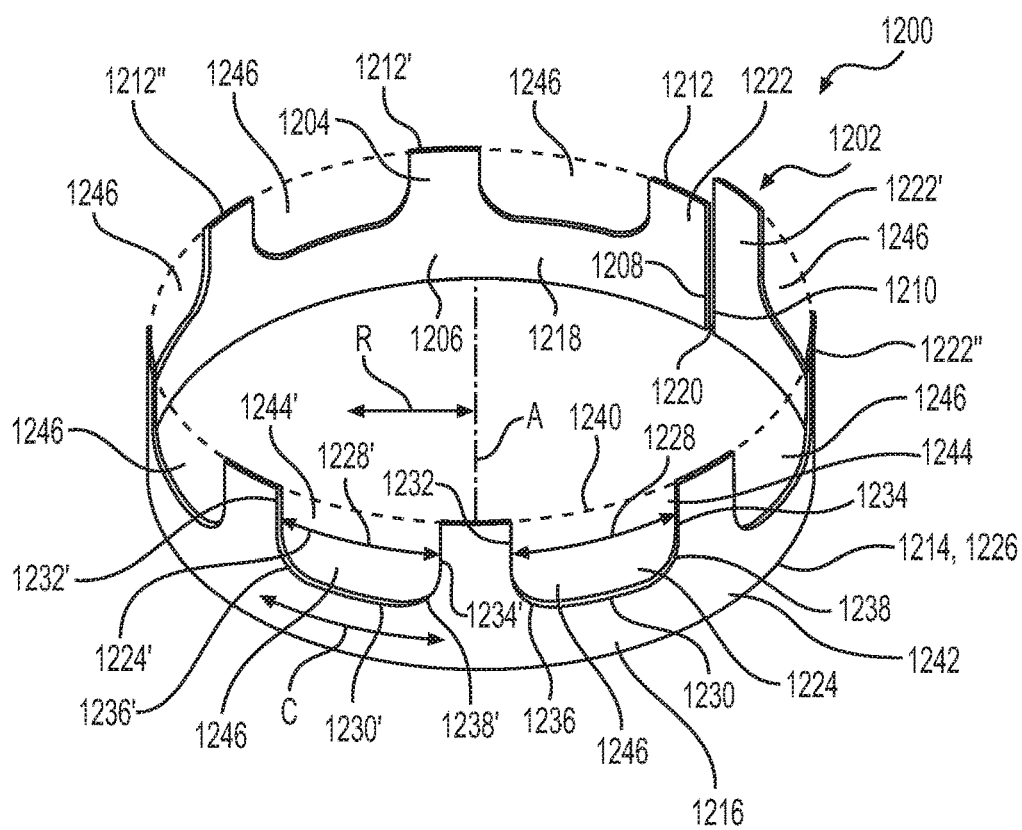
FIG. 24 is a perspective view of the base ring used in the coil subassembly of FIG. 19. This base ring includes notches for enhanced air flow.

Referring now to FIG. 24, a notched base ring 1200 according to an embodiment of the present disclosure used in FIGS. 20 thru 22, is shown in isolation from the coil subassembly 1100. The notched base ring 1200 may comprise a base ring sheet body 1202 including a top portion 1204, a bottom portion 1206, a first end 1208 connecting the top portion 1204 to the bottom portion 1206, and a second end 1210 connecting the bottom portion 1206 to the top portion 1204. The top portion 1204 may include a plurality of attachment lugs 1222 and define a plurality of notches 1224, each notch 1224 being at least partially defined by two lugs 1222 disposed on opposite sides of the notch 1224. The top portion 1204 also includes an angled top edge 1212 (forms an oblique angle to the axis A) that is disposed at each of the attachment lugs 1222, and the bottom portion 1206 includes an uninterrupted bottom support edge 1214 that is straight (perpendicular to the axis A).

In addition, the base ring sheet body 1202 may define a base ring sheet body length 1226 from the first end 1208 to the second end 1210 measured along a direction parallel to the bottom support edge 1214, and each notch 1224 may define the same notch width 1228 measured along a direction parallel to the bottom support edge 1214, and a ratio of the notch width 1228 to the base ring sheet body length 1226 may range from 10:1 to 15:1. The base ring sheet body 1202 may define a bottom notch edge 1230 disposed at the bottom of each notch 1224, and the bottom notch edge 1230 of each notch 1224 may be equidistant from the bottom support edge 1214.

As shown in FIG. 24, wherein the base ring sheet body 1202 is formed into a substantially cylindrical configuration, defining a radial direction R, an axial direction A, and a circumferential direction C, and including an outer cylindrical surface 1216, an inner cylindrical surface 1218, and defining a gap 1220 between the first end 1208 and the second end 1210 of the base ring sheet body 1202 that are disposed adjacent each other circumferentially. It is to be understood that the base ring sheet body 1202 will initially be flat before being formed or bent into the desired shape.

Moreover, each notch 1224 may be defined by a bottom notch edge 1230 parallel to the bottom support edge 1214, a first lateral edge 1232 on one side of the notch 1224 and a second lateral edge 1234 on the other side of the notch 1224, a first blend 1236 transitioning from the first lateral edge 1232 to the bottom notch edge 1230, a second blend 1238 transitioning from the bottom notch edge 1230 to the second lateral edge 1234, and a theoretical top angled edge 1240, and the base ring 1200 defines a theoretical outer cylindrical surface area 1242 including the notches 1224, an individual notch surface area 1244 calculated by projecting the area defined by the bottom edge 1230, first lateral edge 1232, first blend 1236, second blend 1238, second lateral edge 1234, and theoretical top angled edge 1240 radially onto the outer cylindrical surface 1216, and a total notch surface area 1246 calculated by summing the individual notch surface areas 1244. The ratio of the total notch surface area 1246 to the theoretical outer cylindrical surface area 1242 may range from 2:1 to 3:1 and the gap 1220 may define a minimum distance ranging from 0.125" to 0.500".

For the specific embodiment shown in FIG. 24, the base ring sheet body 1202 defines eight notches 1224 and nine attachment lugs 1222. Each notch 1224 is similarly configured and the first lateral edge 1232 and the second lateral edge 1234 of each notch 1224 defines a different axial length, being parallel to the axis A, than any other lateral edge of any other notch 1224. Also, an attachment lug 1222 forms at least partially the first end 1208 of the base ring sheet body 1202 and another attachment lug 1222 forms at least partially the second end 1210 of the base ring sheet body 1202.

The configuration of any embodiment of a base ring such as base ring 1000, 1200 discussed herein may be varied as needed or desired in other embodiments. For instance, the number, shape, and placement of notches 1224 and/or attachment lugs 1222 as well as other features of the base ring such as base ring 1000, 1200 may be different than what has been specifically shown and described with reference to FIGS. 17 thru 24. Steel such as ASTM A1011 GR50, stainless steel, or any other suitably durable and corrosion resistant material may be used for the base ring 1000, 1200, etc.

INDUSTRIAL APPLICABILITY

In practice, a combustion chamber gasket, a combustion chamber subassembly, a heat exchanger subassembly, a blower and heat exchanger assembly, and/or a pressure washer according to any embodiment described herein may be provided, sold, manufactured, and bought etc. or otherwise provided as needed or desired in an aftermarket or OEM (Original Equipment Manufacturer) context using a combustion chamber gasket as suggested herein. It is to be understood that any of these embodiments may differently be sized and configured compared to any version specifically shown in the figures.

The use of a combustion chamber gasket may increase the efficiency of the heat exchanger in a significant way since the use of the gasket forces the air to circulate within multiple flow passages over a plurality of coils of heat exchange tubing and in-between the individual pitches of a coil in some instances. Table II below illustrates that the heat transfer efficiency may be increased by approximately 4%.

As a result, less fuel may be consumed by the pressure washer in use, which leads to greater profit for the economic endeavor using the pressure washer as well as decreased emissions, etc.

TABLE II

| | °F. Temperature of Stack (average) | PPM CO (average) | % Efficiency Net (average) |
|---|---|---|---|
| With Gasket Time Interval | | | |
| 0-5 seconds | 317.3 | 58 | 85.8 |
| 6-10 seconds | 317.3 | 59 | 85.8 |
| 11-15 seconds | 317.3 | 59 | 85.8 |
| 16-20 seconds | 317.3 | 59 | 85.8 |
| 21-25 seconds | 317.5 | 60 | 85.8 |
| 26-28 seconds | 317.5 | 59 | 85.8 |
| Without Gasket Time Interval | | | |
| 0-5 seconds | 457.0 | 174 | 81.8 |
| 6-10 seconds | 456.7 | 174 | 81.7 |
| 11-16 seconds | 456.4 | 170 | 81.7 |
| 17-25 seconds | 456.2 | 166 | 81.7 |
| 26-27 seconds | 455.7 | 166 | 81.7 |

More specifically, the data in Table II indicates that the combustion in the chamber becomes more efficient, leading to a decrease in CO (carbon monoxide) emissions. This increase in combustion efficiency may be explained by the higher pressure obtained in the combustion chamber achieved by using the gasket, increasing local air velocities and improving fuel and air mixing. This results in improved combustion and reduced harmful emissions. Also, the heat transfer becomes more efficient as evidenced by the lower exit temperature of the heated air and exhaust gases as more heat is transferred to the water or other cleaning fluid through the heat exchange tubing. The average net increase in efficiency is approximately 4%. This may represent a significant savings to an economic endeavor using such a pressure washer having a heat exchanger using a combustion chamber gasket.

Likewise, in practice, a base ring, a coil subassembly, a heat exchanger subassembly, a blower and heat exchanger assembly, and/or a pressure washer according to any embodiment described herein may be provided, sold, manufactured, and bought etc. or otherwise provided as needed or desired in an aftermarket or OEM (Original Equipment Manufacturer) context using any embodiment of a base ring as suggested herein. It is to be understood that any of these embodiments may be differently sized and configured compared to any version specifically shown in the figures.

The use of a notched base ring may increase the efficiency of the heat exchanger in a significant way since the use of the notched base ring allows more air to flow freely through the coils. Table III below illustrates that the emissions may decreased substantially.

TABLE III

| | % $O_2$ (average) | Excess Air (average) |
|---|---|---|
| Medium Sized Heat Exchanger With Notched Base Ring | | |
| 0-30 seconds | 11.38 | 105.6 |
| Large Sized Heat Exchanger with Notched Ring | | |
| 0-27 seconds | 12.045 | 119.6 |

TABLE III-continued

| | % $O_2$ (average) | Excess Air (average) |
|---|---|---|
| Medium Sized Heat Exchanger Without Notched Base Ring | | |
| 0-32 seconds | 10.55 | 90.5 |

The main point of improvement on the emissions results would be the amount of Excess Air and % $O_2$ columns. Comparing the notched base ring performance to the solid base ring performance, it can be seen that the % $O_2$ has increased which means that more air is allowed to flow freely through the coil. This also translates to more excess air and higher exhaust temperatures. The exhaust temperatures are higher due to the higher air velocities moving through the coil which decreases the dwell time of the hot exhaust gases in the heat exchanger. Given this improvement, the inventor(s) were free to dial back the air coming into the heat exchanger depending on the elevation to allow for higher elevation operation in different parts of the country. Also, the inventor(s) were able to reduce the load on the blower motor and power source due to the lower volume of air necessary to overcome the smaller restriction of the castellated base ring. Dialing back the air was done in later experiments which show a lower exhaust temperature and longer dwell time for the exhaust gases in the heat exchanger. This may be seen with reference to Table II above.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A combustion chamber subassembly for use with a pressure washer, the combustion chamber subassembly comprising:
    a top bell member defining an interior combustion chamber and an exterior, the top bell member including a top diffuser wall, a first side wall extending from the top diffuser wall toward the interior combustion chamber of the top bell member, a second side wall extending outwardly and downwardly from the first side wall and away from the interior of the top bell member; and
    a gasket that is attached to the top bell member, contacting the first side wall and the second sidewall.

2. The combustion chamber subassembly of claim 1, further comprising a cover attached to the top bell member and wherein the first side wall forms an exterior obtuse angle with the second side wall ranging from 130 degrees to 140 degrees.

3. The combustion chamber subassembly of claim 2, wherein the cover and top bell member each have an annular shape, sharing the same axis of revolution, and the top bell member further comprises a third side wall extending along a direction parallel with the axis.

4. The combustion chamber subassembly of claim 3, further comprising a bottom member including a fourth side wall extending along a direction parallel with the axis and contacting the exterior of the top bell member on the third side wall.

5. The combustion chamber subassembly of claim 4, wherein the bottom member is a bottom bell member having a circular annular shape sharing the same axis of revolution as the cover and top bell member, the bottom bell member also defining an interior and an exterior, and including a bottom diffuser wall extending from the fourth side wall toward the interior of the bottom bell member.

6. The combustion chamber subassembly of claim 4, wherein the gasket includes an upper axial extremity, a lower axial extremity, and defines an axial length measured from the upper axial extremity to the lower axial extremity ranging from 1.5" to 2.0".

7. The combustion chamber subassembly of claim 6, wherein the bottom member has an annular shape defining an axis of revolution coincident with the axis of revolution of the cover and the top bell member, the bottom member also defining an exterior and an interior, and the lower axial extremity of the gasket contacts the fourth side wall of the bottom member on the exterior of the bottom member, causing the gasket to expand locally to provide a fluid tight seal.

8. The combustion chamber subassembly of claim 1, wherein the gasket is made from a material that is flexible and is riveted to the top bell member.

* * * * *